(12) United States Patent
Park et al.

(10) Patent No.: US 9,927,929 B2
(45) Date of Patent: Mar. 27, 2018

(54) TOUCH SENSING SYSTEM AND METHOD FOR DRIVING THE SAME BY CHANGING A FREQUENCY OF A RESONANT INDUCTIVE SIGNAL

(71) Applicant: LG DISPLAY CO., LTD., Seoul (KR)

(72) Inventors: Dongjo Park, Seoul (KR); Sojung Jung, Goyang-si (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 14/528,569

(22) Filed: Oct. 30, 2014

(65) Prior Publication Data

US 2015/0123940 A1 May 7, 2015

(30) Foreign Application Priority Data

Nov. 1, 2013 (KR) .......................... 10-2013-0131882

(51) Int. Cl.
  *G06F 3/044* (2006.01)
  *G06F 3/041* (2006.01)
(52) U.S. Cl.
  CPC ............ *G06F 3/044* (2013.01); *G06F 3/0416* (2013.01); *G06F 2203/04106* (2013.01)
(58) Field of Classification Search
  None
  See application file for complete search history.

(56) References Cited

U.S. PATENT DOCUMENTS

| | | | | |
|---|---|---|---|---|
| 5,134,689 A | * | 7/1992 | Murakami | G06F 3/046 345/177 |
| 6,667,740 B2 | * | 12/2003 | Ely | G01D 5/2073 178/19.03 |
| 7,903,085 B2 | | 3/2011 | Yamamoto et al. | |
| 8,089,474 B2 | * | 1/2012 | Geaghan et al. | 345/174 |
| 8,094,133 B2 | * | 1/2012 | Sato et al. | 345/173 |
| 2008/0149401 A1 | * | 6/2008 | Hagen et al. | 178/18.08 |
| 2008/0149402 A1 | * | 6/2008 | Vos | 178/19.01 |
| 2008/0150917 A1 | * | 6/2008 | Libbey et al. | 345/179 |
| 2008/0150918 A1 | * | 6/2008 | Hagen | G06F 3/046 345/179 |
| 2009/0076770 A1 | * | 3/2009 | Fukushima et al. | 702/150 |
| 2009/0166100 A1 | * | 7/2009 | Matsubara | 178/18.06 |
| 2010/0117994 A1 | * | 5/2010 | Fukushima et al. | 345/179 |

(Continued)

FOREIGN PATENT DOCUMENTS

CN 1035376 A 9/1989
CN 101937296 A 1/2011
(Continued)

*Primary Examiner* — David D Davis
(74) *Attorney, Agent, or Firm* — Dentons US LLP

(57) ABSTRACT

A touch sensing system and a method for driving the same. The touch sensing system includes a pen with a resonant circuit embedded therein, XY electrodes including X electrodes and Y electrodes substantially perpendicular to the X electrodes, an antenna surrounding the XY electrodes, and a first touch driving circuit. The first touch driving circuit supplies a resonant inductive signal to the XY electrodes, analyzes a resonance signal received through the antenna, and decides a location and a pen pressure of the pen. The resonant inductive signal includes N periods each having a different duration, and wherein N is a positive integer equal to or greater than 2.

14 Claims, 22 Drawing Sheets

(56) References Cited

U.S. PATENT DOCUMENTS

2013/0207925 A1* 8/2013 Ryshtun et al. .............. 345/174
2014/0132529 A1* 5/2014 Jeong ............................ 345/173

FOREIGN PATENT DOCUMENTS

| CN | 102141867 A | 8/2011 |
| CN | 102662494 A | 9/2012 |
| CN | 103294228 A | 9/2013 |

* cited by examiner

FIG. 9
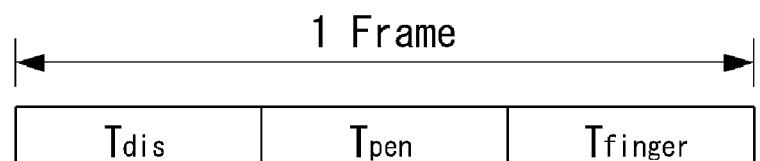
(A)
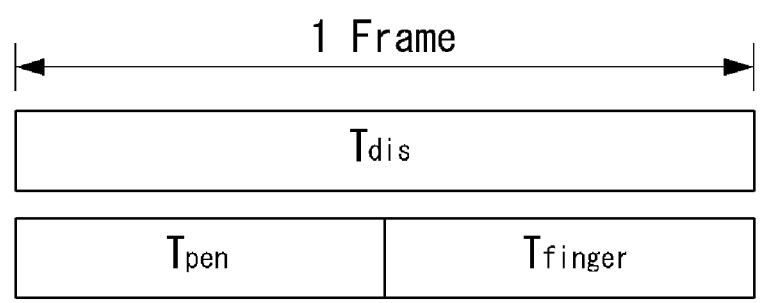
(B)

FIG. 17
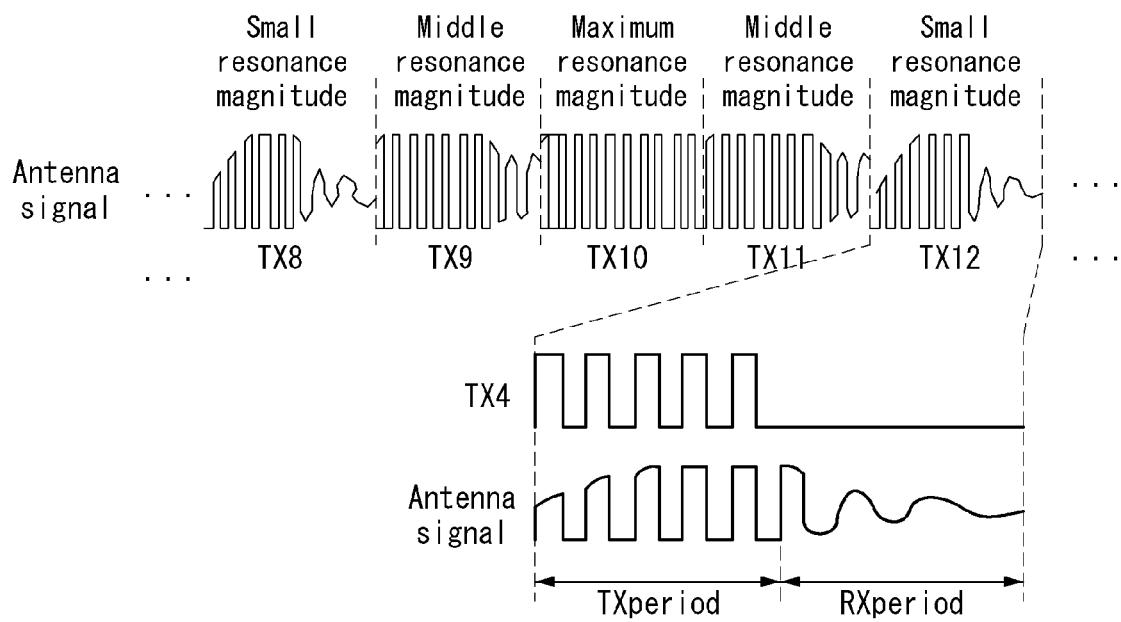
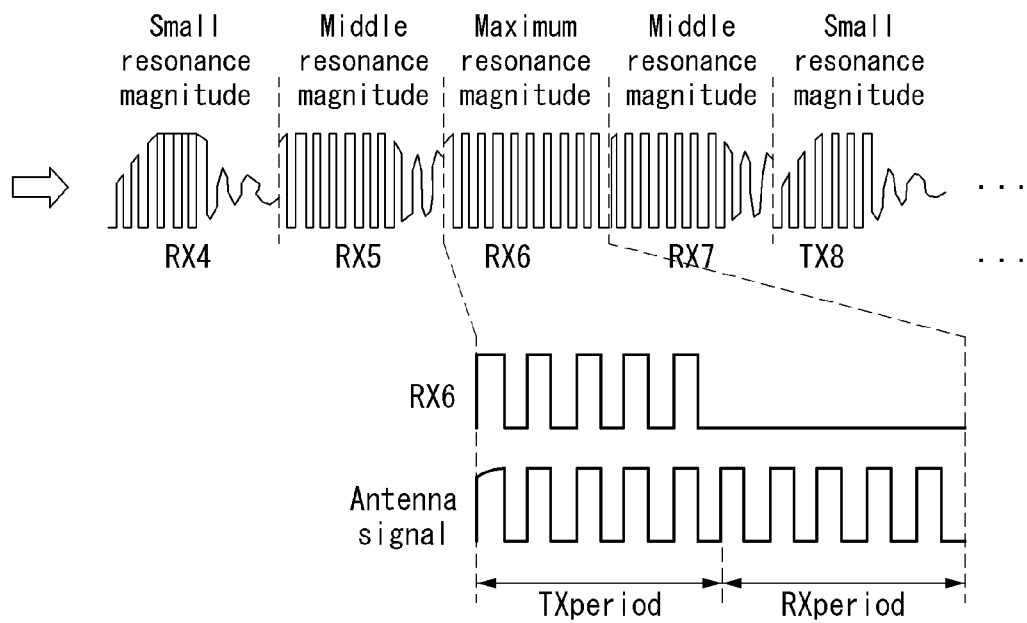

FIG. 18
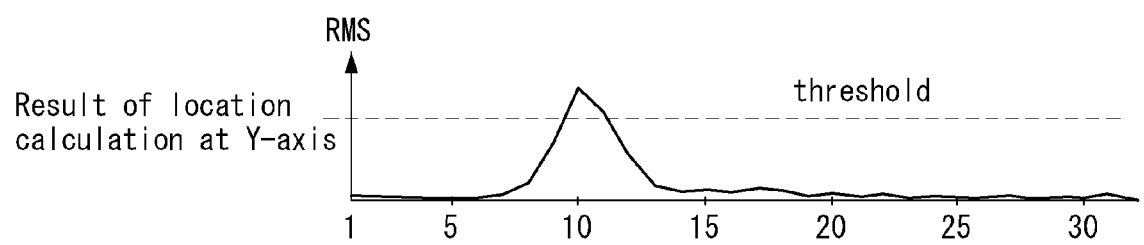
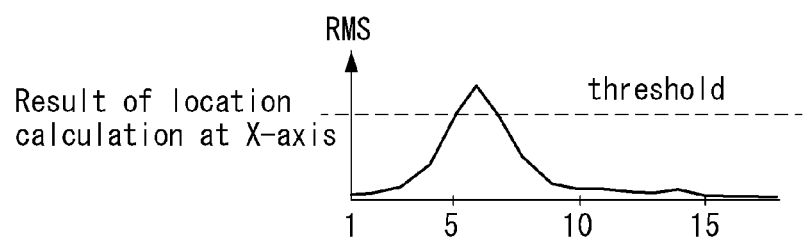

TOUCH SENSING SYSTEM AND METHOD FOR DRIVING THE SAME BY CHANGING A FREQUENCY OF A RESONANT INDUCTIVE SIGNAL

CROSS REFERENCE TO RELATED APPLICATIONS

This application claims the benefit of Korean Patent Application No. 10-2013-00131882 filed on Nov. 1, 2013, the entire contents of which is incorporated herein by reference for all purposes as if fully set forth herein.

BACKGROUND

Field of the Disclosure

Embodiments of the invention relate to a touch sensing system and a method for driving the same capable of sensing a pen and a finger.

Discussion of the Related Art

User interface (UI) is configured so that users are able to communicate with various electronic devices and thus can easily and comfortably control the electronic devices as they desire. Examples of the user interface include a keypad, a keyboard, a mouse, an on-screen display (OSD), and a remote controller having an infrared communication function or a radio frequency (RF) communication function. User interface technology has continuously expanded to increase user's sensibility and handling convenience. The user interface has been recently developed to include touch UI, voice recognition UI, 3D UI, etc.

The touch UI has been indispensably used in portable information appliances and has been expanded to the use of home appliances. The touch UI senses a location of a finger or a pen touching a touch screen and generates location information.

The touch screen is classified into a touch screen sensing a conductor, for example, the finger, and a touch screen sensing the pen. An example of the latter pen touch screen is disclosed in U.S. Pat. No. 7,903,085 (Mar. 8, 2011) (hereinafter, referred to as "a related art pen touch sensing device"). The related art pen touch sensing device includes a special pen including a resonant circuit embedded therein, a loop antenna receiving a resonance signal from the special pen, and an analog signal processing unit extracting location information and pen pressure information of the special pen from a signal of the loop antenna.

As shown in FIG. 1, in the related art pen touch sensing device, a square wave signal (a resonant inductive signal) of an electromagnetic field for inducing a resonance of a pen PEN is propagated through an electromagnetic resonance path through an antenna ANT and is transmitted to the pen PEN. A resonance signal of the electromagnetic field generated from a resonant circuit of the pen PEN is propagated through the electromagnetic resonance path and is received by the antenna ANT. The resonant circuit of the pen PEN is resonated by the square wave signal applied through an electromagnetic resonance, i.e., the electromagnetic field and transmits the resonance signal to the loop antenna in the electromagnetic field. Thus, in the related art pen touch sensing device, the pen PEN and the antenna ANT transmit and receive the resonance signal in the electromagnetic field.

The related art pen touch sensing device inputs the resonance signal received through the loop antenna to an analog circuit. The analog circuit includes a location decision circuit deciding a location of the pen based on a phase of the resonance signal received through the loop antenna and a pen pressure decision circuit deciding a pen pressure of the pen based on the phase of the resonance signal.

The related art pen touch sensing device has the following problems.

The related art pen touch sensing device requires the plurality of loop antennas and switch circuits for sequentially driving the loop antennas, so as to detect a touch location of the pen in an XY coordinate system. The loop antennas have to be implemented in an overlapped shape of a matrix form, so as to recognize a touch point in the XY coordinate system. Further, because a separate antenna layer has to be added to a display panel so as to implement the loop antennas in the display panel, a thickness of the display panel increases. Because a structure for connecting the plurality of loop antennas and the analog signal processing unit to the display panel has to be added, a cable connection equipment becomes large and complicated. Thus, when the plurality of loop antennas are integrated in the display panel, it is difficult to slim and simplify a display device.

Because a pulse generator used in the related art pen touch sensing device limits a frequency region of the resonant inductive signal, it is difficult to change a resonant frequency. An oscillator of the pulse generator has to be replaced or has to be replaced with a phase lock loop (PLL), etc. so as to change a frequency of the resonant inductive signal.

Because the related art pen touch sensing device compares received signals of the pen using an analog comparator, only the presence or absence of the pen may be recognized and it is difficult to accurately represent coordinates of the touch location of the pen.

Because the related art pen touch sensing device additionally includes the location decision circuit and the pen pressure decision circuit, the circuit complexity increases and also an amount of operations increases. Hence, power consumption increases.

Because the phase of the resonance signal received from the antenna in the related art pen touch sensing device sensitively varies depending on a surrounding environment, it is difficult to accurately detect the phase of the resonance signal due to parasitic capacitances of the loop antenna.

Because the analog signal processing unit used in the related art pen touch sensing device shows different operation results depending on the surrounding environment, such as a temperature and humidity, its reliability is low.

SUMMARY

Accordingly, embodiments of the present invention are directed to a touch sensing system and a method for driving the same that substantially obviates one or more problems due to limitations and disadvantages of the related art.

An aspect of embodiments of the present invention is directed to provide a touch sensing system and a method for driving the same capable of sensing a finger and a pen without an increase in a thickness of a display panel and easily changing a frequency of a resonant inductive signal.

Additional advantages and features of embodiments of the invention will be set forth in part in the description which follows and in part will become apparent to those having ordinary skill in the art upon examination of the following or may be learned from practice of embodiments of the invention. These and other advantages of embodiments of the invention may be realized and attained by the structure particularly pointed out in the written description and claims hereof as well as the appended drawings.

To achieve these and other advantages and in accordance with the purpose of embodiments of the invention, as embodied and broadly described herein, there is provided a touch sensing system that may include a pen with a resonant circuit embedded therein, XY electrodes including X electrodes and Y electrodes substantially perpendicular to the X electrodes, an antenna configured to surround the XY electrodes, and a first touch driving circuit to supply a resonant inductive signal to the XY electrodes, analyze a resonance signal received through the antenna, and decide a location and a pen pressure of the pen.

The resonant inductive signal includes N periods, each having a different duration, wherein N is a positive integer equal to or greater than 2.

In another aspect, there is provided a method for driving a touch sensing system including a pen with a resonant circuit embedded therein, XY electrodes including X electrodes and Y electrodes perpendicular to the X electrodes, and an antenna surrounding the XY electrodes, the method may include supplying a resonant inductive signal to the XY electrodes, and analyzing a resonance signal received through the antenna to decide a location and a pen pressure of the pen, wherein the resonant inductive signal includes N periods each having a different duration, where N is a positive integer equal to or greater than 2.

It is to be understood that both the foregoing general description and the following detailed description of embodiments of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings:

FIG. 9 shows one frame period according to an exemplary embodiment of the invention;

FIGS. 17 and 18 show an example of a method for deciding a touch location of a pen;

DETAILED DESCRIPTION OF THE EMBODIMENTS

Reference will now be made in detail to embodiments of the invention, examples of which are illustrated in the accompanying drawings. Wherever possible, the same reference numbers will be used throughout the drawings to refer to the same or like parts. It will be paid attention that detailed description of known arts will be omitted if it is determined that the arts can mislead the embodiments of the invention.

Figure 1:
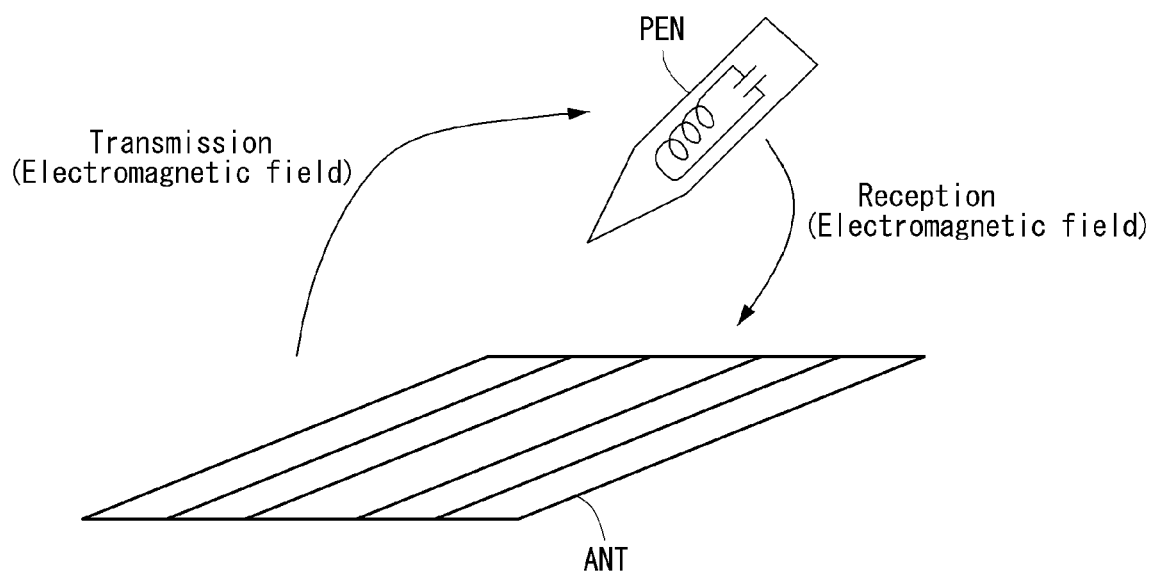
FIG. 1 shows the transmission and the reception of a resonance signal in a related art pen touch sensing device.
Figure 2:
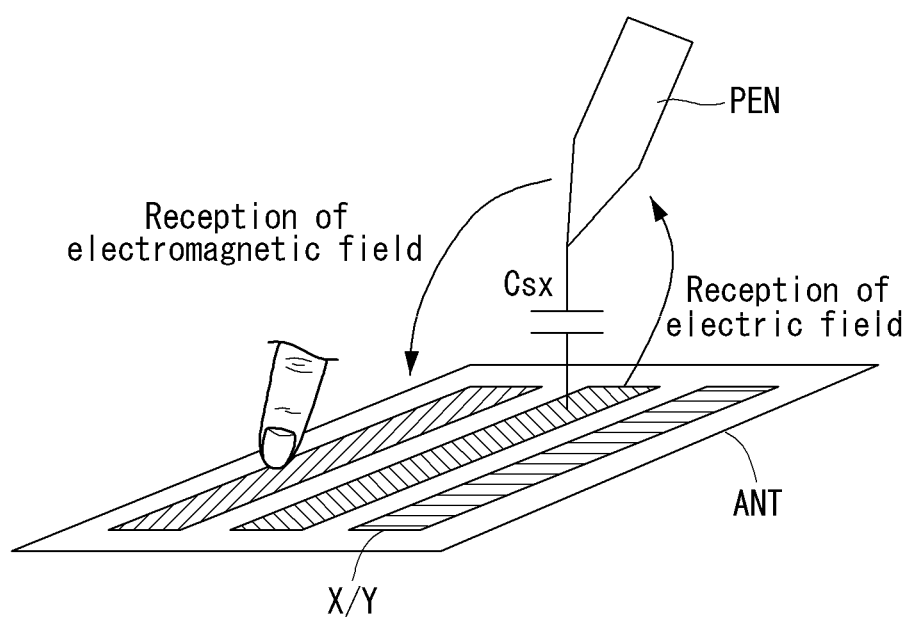
FIG. 2 shows the transmission of a resonance signal in a electric field and the reception of the resonance signal in an electromagnetic field in a touch sensing system according to an exemplary embodiment of the invention.
Figure 3:
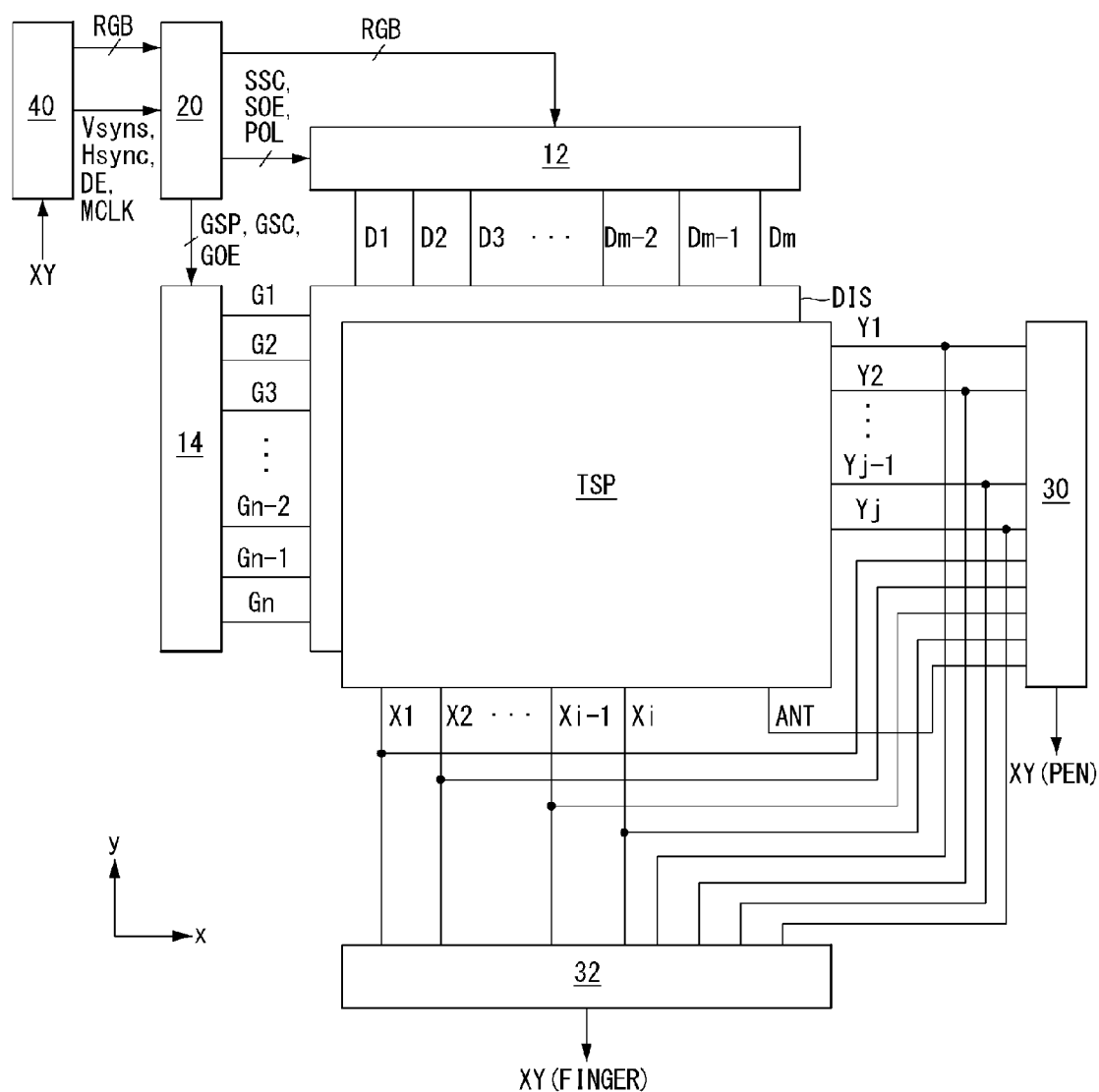
FIG. 3 is a block diagram of a touch sensing system according to an exemplary embodiment of the invention.

As shown in FIG. 2, a touch sensing system according to an exemplary embodiment of the invention includes a plurality of XY electrodes X/Y, an antenna ANT, and a pen PEN.

The XY electrodes X/Y are divided into an X electrode group and a Y electrode group. The X electrode group includes a plurality of X electrodes. The Y electrode group includes a plurality of Y electrodes perpendicular to the X electrodes with a dielectric interposed therebetween. The XY electrodes X/Y substantially have the same structure as electrodes formed in an existing capacitive touch screen. Thus, the embodiment of the invention may implement the XY electrodes X/Y as electrodes of a touch screen for an existing finger touch sensing operation.

The XY electrodes X/Y overlap a pixel array of a display panel, on which an input image is displayed. Thus, the XY electrodes X/Y may be formed of a material with a high transmittance, for example, indium tin oxide (ITO). The XY electrodes X/Y are electrically coupled with the pen PEN through a capacitance Csx. The capacitance Cx is a capacitance formed between the XY electrodes X/Y and the pen PEN. An electrical coupling is generated between the XY electrodes X/Y and the pen PEN through the capacitance Cx. The XY electrodes X/Y transmit a resonant inductive signal of an electric field to the pen PEN through the capacitance Csx.

The pen PEN includes a resonant circuit. The resonant circuit of the pen PEN resonates in response to the resonant inductive signal received through the parasitic capacitance Csx and generates a resonance signal. When a tip of the pen PEN is pressed on the touch screen, an inductance (L) value and a capacitance (C) value in the resonant circuit of the pen PEN change. Hence, a resonant frequency of the resonant circuit changes. Thus, changes in a pen pressure of the pen PEN result in changes in the resonant frequency. The resonance signal from the pen PEN is transmitted to the antenna ANT through an electromagnetic resonance path.

The antenna ANT receives the resonance signal of the pen PEN. The antenna ANT may be implemented as a single loop antenna surrounding the XY electrodes X/Y. The touch sensing system according to the embodiment of the invention senses a touch input of a finger based on changes in the capacitance Csx through the XY electrodes X/Y and senses a touch input of the pen PEN using the XY electrodes X/Y and the antenna ANT.

The touch sensing system according to the embodiment of the invention may be coupled with various types of display devices. The display device may be implemented based on a flat panel display, such as a liquid crystal display (LCD), a field emission display (FED), a plasma display panel (PDP), an organic light emitting display, and an electrophoresis display (EPD). In the following description, the embodiment of the invention will be described using the liquid crystal display as an example of the flat panel display. Other flat panel displays may be used.

As shown in FIGS. 3 to 6, the display device according to the embodiment of the invention includes a display panel DIS, a display driving circuit, a touch screen TSP, a touch screen driving circuit, and the like.

The display panel DIS includes a liquid crystal layer formed between an upper substrate GLS1 and a lower substrate GLS2. A pixel array of the display panel DIS includes pixels formed in pixel areas defined by data lines D1 to Dm and gate lines (or scan lines) G1 to Gn, where m and n are a positive integer. Each pixel includes thin film transistors (TFTs) formed at crossings of the data lines D1 to Dm and the gate lines G1 to Gn, a pixel electrode charged to a data voltage, a storage capacitor which is connected to the pixel electrode and holds a voltage of a liquid crystal cell, and the like.

Black matrixes, color filters, etc. are formed on the upper substrate GLS1 of the display panel DIS. The lower substrate GLS2 of the display panel DIS may be configured in a COT (color filter on TFT) structure. In this instance, the black matrixes and the color filters may be formed on the lower substrate GLS2 of the display panel DIS. Common electrodes, to which a common voltage Vcom is supplied, may be formed on the upper substrate GLS1 or the lower substrate GLS2 of the display panel DIS. Polarizing plates are respectively attached to the upper substrate GLS1 and the lower substrate GLS2 of the display panel DIS. Alignment layers for setting a pre-tilt angle of liquid crystals are respectively formed on the inner surfaces contacting the liquid crystals in the upper substrate GLS1 and the lower substrate GLS2 of the display panel DIS. A column spacer is formed between the upper substrate GLS1 and the lower substrate GLS2 of the display panel DIS to keep a cell gap of the liquid crystal cells constant.

A backlight unit may be disposed under a back surface of the display panel DIS. The backlight unit may be implemented as one of an edge type backlight unit and a direct type backlight unit and irradiates light onto the display panel DIS. The display panel DIS may be implemented in any known mode including a twisted nematic (TN) mode, a vertical alignment (VA) mode, an in-plane switching (IPS) mode, a fringe field switching (FFS) mode, etc.

The display driving circuit includes a data driving circuit 12, a scan driving circuit 14, and a timing controller 20. The display driving circuit applies data of an input image to the pixels of the display panel DIS. The data driving circuit 12 converts digital video data RGB of the input image received from the timing controller 20 into positive and negative analog gamma compensation voltages and outputs a data voltage. The data driving circuit 12 then supplies the data voltage to the data lines D1 to Dm. The scan driving circuit 14 sequentially supplies a gate pulse (or scan pulse) synchronized with the data voltage to the gate lines G1 to Gn and selects lines of the display panel DIS, to which the data is applied.

The timing controller 20 receives timing signals, such as a vertical sync signal Vsync, a horizontal sync signal Hsync, a data enable signal DE, and a main clock MCLK, from a host system 40. The timing controller 20 generates a data timing control signal and a scan timing control signal for respectively controlling operation timings of the data driving circuit 12 and the scan driving circuit 14 using the timing signals. The data timing control signal includes a source sampling clock SSC, a source output enable signal SOE, a polarity control signal POL, etc. The scan timing control signal includes a gate start pulse GSP, a gate shift clock GSC, a gate output enable signal GOE, and the like.

The timing controller 20 multiplies a frame rate of the input image by 'N' to obtain a frequency of (frame rate×N) Hz, where N is a positive integer equal to or greater than 2. Hence, the timing controller 20 may control an operation frequency of each of the display driving circuit and the touch screen driving circuit based on the frequency of (frame rate×N) Hz. The frame rate of the input image is 60 Hz (one frame period=16.67 msec) in a national television standards committee (NTSC) scheme and is 50 Hz (one frame period=20 msec) in a phase alternate line (PAL) scheme.

Figure 8:
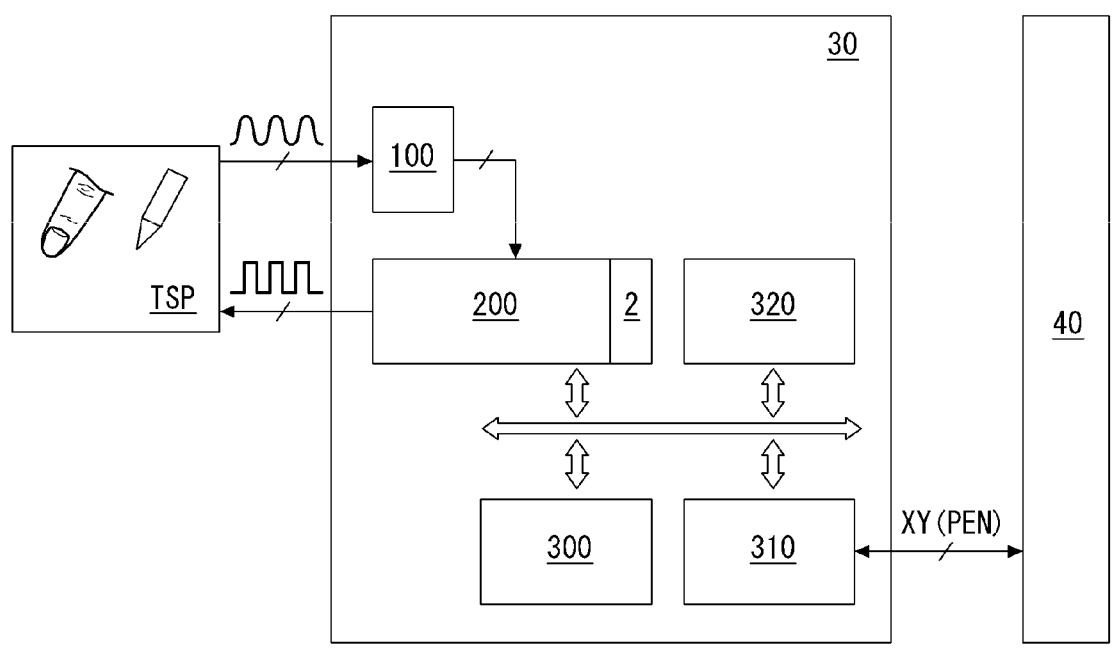
FIG. 8 shows an example where a first touch driving circuit is integrated into one chip integrated circuit (IC)

The touch screen TSP includes XY electrodes X1 to Xi and Y1 to Yj and the antenna ANT shown in FIG. 8. Touch sensors Cts are formed at crossings of the XY electrodes X1 to Xi and Y1 to Yj, and a charge amount of the touch sensor Cts varies depending on the presence or absence of a conductor, for example, the finger. The XY electrodes X1 to Xi and Y1 to Yj may be implemented as electrodes used in the existing capacitive touch screen sensing a touch input of the finger. Thus, the touch screen TSP according to the embodiment of the invention may be simply implemented by additionally installing the antenna ANT at an edge of the existing capacitive touch screen.

Figure 4:
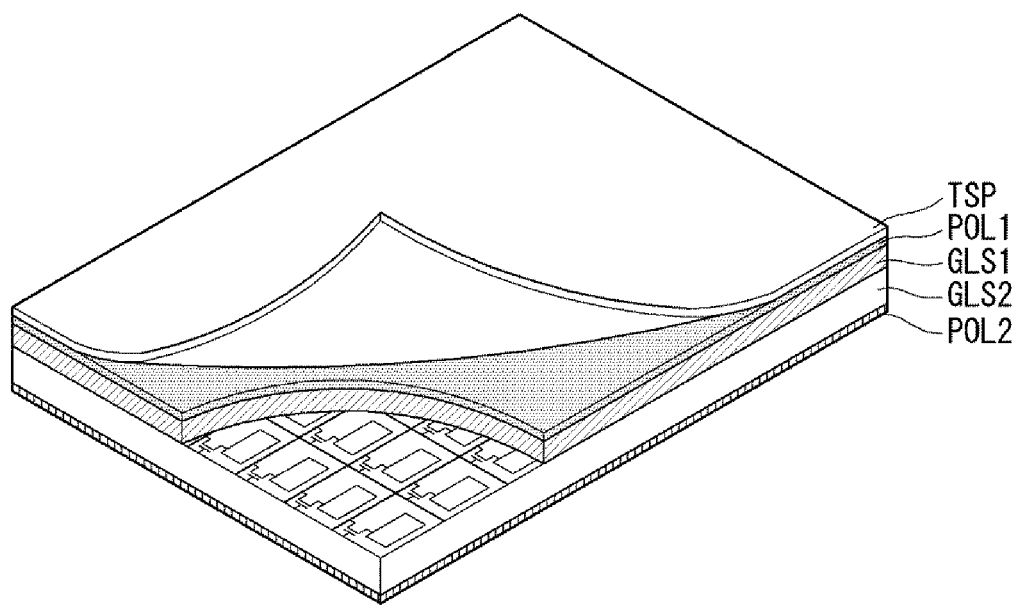
FIGS. 4 to 6 illustrate various combinations of a touch screen and a display panel according to an exemplary embodiment of the invention.
Figure 5:
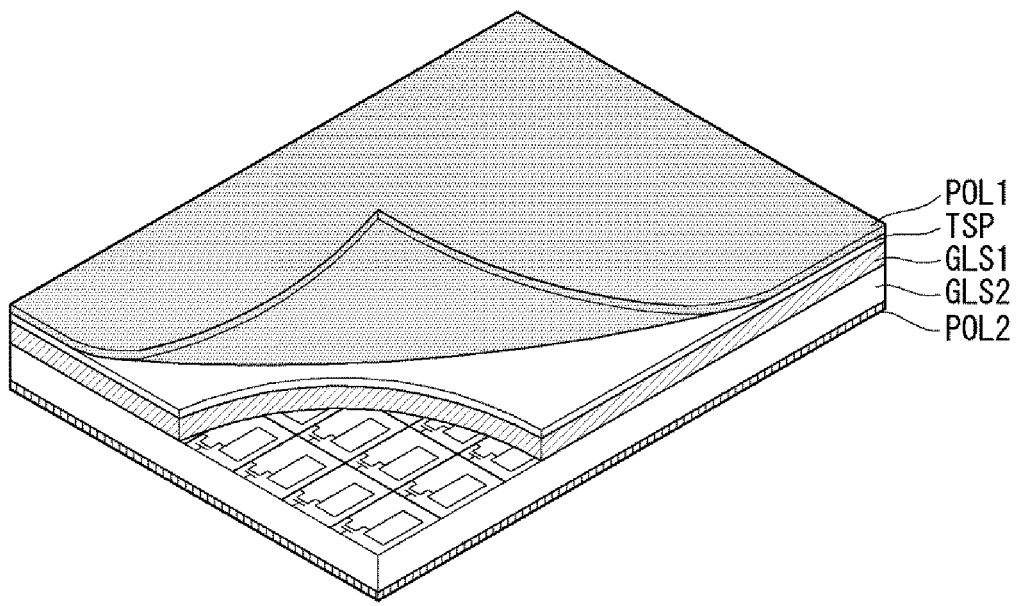
Figure 6:
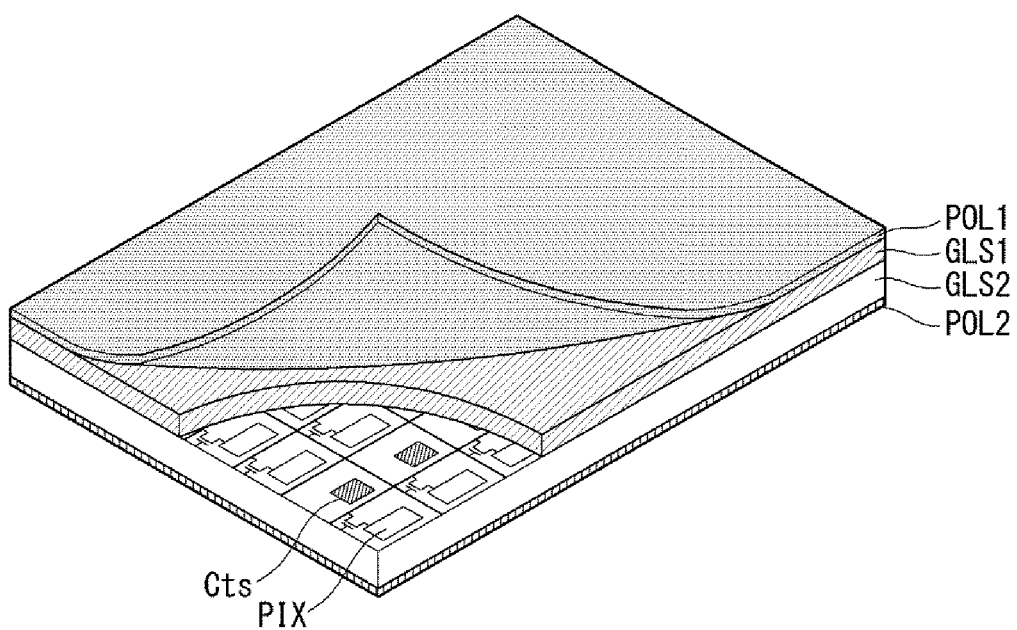

As shown in FIG. 4, the XY electrodes X1 to Xi and Y1 to Yj and the antenna ANT of the touch screen TSP may be attached on an upper polarizing plate POL1 of the display panel DIS. Alternatively, as shown in FIG. 5, the XY electrodes X1 to Xi and Y1 to Yj and the antenna ANT of the touch screen TSP may be formed between the upper polarizing plate POL1 and the upper substrate GLS1 of the display panel DIS. Alternatively, as shown in FIG. 6, the XY electrodes X1 to Xi and Y1 to Yj and the antenna ANT of the touch screen TSP may be embedded in the lower substrate GLS2 of the display panel DIS along with the pixel array of the display panel DIS in an in-cell type. In FIGS. 4 to 6, 'PIX' denotes the pixel electrode of the liquid crystal cell, and TOL2' denotes a lower polarizing plate of the display panel DIS. The XY electrodes X1 to Xi and Y1 to Yj and the antenna ANT of the touch screen TSP may be formed on the same plane or different planes. In the in-cell type shown in FIG. 6, the XY electrodes X1 to Xi and Y1 to Yj may be implemented through the division of the common electrodes of the pixel array.

The touch screen driving circuit includes a first touch driving circuit 30 and a second touch driving circuit 32.

The first touch driving circuit 30 sequentially supplies the resonant inductive signal to the XY electrodes X1 to Xi and Y1 to Yj and receives the resonance signal of the pen PEN through the antenna ANT. The first touch driving circuit 30 converts the resonance signal of the pen PEN received through the antenna ANT into digital data and measures a resonance magnitude at each resonant frequency. The first touch driving circuit 30 compares the resonance magnitude of the resonance signal with a predetermined reference value and decides touch location information XY of the pen PEN. Further, the first touch driving circuit 30 measures a pen pressure of the pen PEN based on frequency characteristic of the resonance signal. Location and pen pressure information XY(PEN) of the pen PEN generated by the first touch driving circuit 30 is transmitted to the host system 40.

The second touch driving circuit 32 applies a stimulus signal (or a driving signal) to the touch sensors Cts and receives charges of the touch sensors Cts in synchronization with the stimulus signal. The second touch driving circuit 32 analyzes an amount of the received charges, decides changes in a capacitance before and after a touch operation of the touch sensors Cts, and senses a touch location of the finger based on the changes in the capacitance.

The touch sensor Cts may be implemented by a self capacitance and a mutual capacitance. The second touch driving circuit 32 sequentially supplies the stimulus signal to the X electrodes or the XY electrodes X1 to Xi and Y1 to Yj, detects changes in the capacitance before and after the touch operation of the touch sensors Cts in synchronization with the stimulus signal, and converts the changes in the capacitance into digital data. The second touch driving circuit 32 compares the digital data with a predetermined reference value and decides touch location information XY(FINGER) of the finger. The touch location information XY(FINGER) of the finger generated by the second touch driving circuit 32 is transmitted to the host system 40. The stimulus signal may be generated as a signal of various shapes, such as a pulse and a triangle wave. The second touch driving circuit 32 may be implemented as a touch driving circuit used in the existing capacitive touch screen sensing the finger touch input.

The host system 40 may be implemented as one of a television system, a set-top box, a navigation system, a DVD player, a Blu-ray player, a personal computer (PC), a home theater system, and a phone system and receives the input image. The host system 40 receives the location and pen pressure information XY(PEN) of the pen PEN from the first touch driving circuit 30 and receives the touch location information XY(FINGER) of the finger from the second touch driving circuit 32.

The host system 40 includes a system on chip (SoC), in which a scaler is embedded, and converts the digital video data RGB of the input image into a data format suitable for displaying on the display panel DIS. The host system 40 transmits the digital video data RGB of the input image and the timing signals Vsync, Hsync, DE, and MCLK to the timing controller 20. Further, the host system 40 runs an application program associated with the location and pen pressure information XY(PEN) of the pen PEN and the touch location information XY(FINGER) of the finger received from the first and second touch driving circuits 30 and 32.

Figure 7:
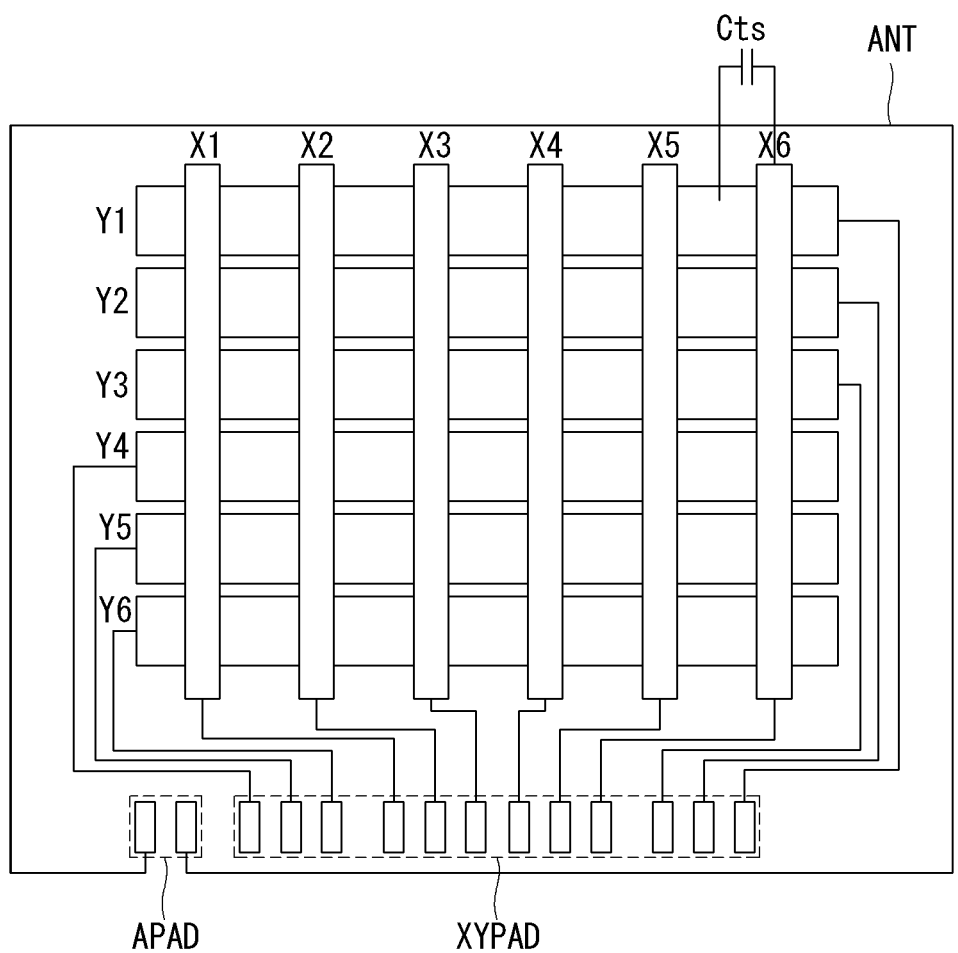
FIG. 7 is a plane view showing a structure of a touch screen according to an exemplary embodiment of the invention.

As shown in FIG. 7, the XY electrodes include X electrodes X1 to X6 arranged in parallel along an x-axis and Y electrodes Y1 to Y6, which are arranged in parallel along a y-axis and are perpendicular to the X electrodes X1 to X6. The antenna ANT may be implemented as a single antenna surrounding the XY electrodes X1 to X6 and Y1 to Y6. The single antenna may be formed in a bezel area outside the pixel array, on which an image is displayed, so that an aperture ratio of the pixels is not reduced. Because the single antenna may be formed on the substantially same layer as the XY electrodes X1 to X6 and Y1 to Y6, the single antenna does not result in an increase in a thickness of the display panel. The first touch driving circuit 30 is connected to the antenna ANT through antenna pads APAD and is connected to the XY electrodes X1 to X6 and Y1 to Y6 through XY pads XYPAD.

FIG. 8 shows an example where the first touch driving circuit 30 is integrated into one chip integrated circuit (IC).

As shown in FIG. 8, one chip IC includes an analog signal processing unit 100, a digital signal processing unit 200, a microprocessor unit (MPU) 300, an interface circuit 310, and a memory 320.

The digital signal processing unit 200 includes a memory 2. The memory 2 stores resonant characteristic of the resonance signal at each resonant frequency, temporarily stores previous data so as to accumulate data in integrators 214 and 216 shown in FIG. 12, and temporarily stores output data of a location and pen pressure decision unit 218 shown in FIG. 12.

The microprocessor unit 300 stores the location and pen pressure information XY(PEN) of the pen PEN in the memory 320. The microprocessor unit 300 interpolates coordinate information of the touch location of the pen PEN, so as to change a resolution of the touch screen TSP in conformity with a resolution of the display panel DIS. The microprocessor unit 300 may perform an additional algorithm for removing a noise and improving a touch recognition performance. The interface circuit 310 transmits the location and pen pressure information XY(PEN) of the pen PEN to the host system 40 through a standard interface.

FIG. 9 shows one frame period according to the embodiment of the invention.

When the touch screen TSP is embedded in the pixel array of the display panel DIS as shown in FIG. 6, electrical coupling is generated between the pixel array and the touch screen TSP and may adversely affect the pixel array and the touch screen TSP. Thus, as shown in (A) of FIG. 9, when the touch screen TSP is embedded in the pixel array of the display panel DIS, one frame period may be time-divided into a display period Tdis, a first touch sensing period Tpen, and a second touch sensing period Tfinger.

When the touch screen TSP is embedded in the pixel array of the display panel DIS, the XY electrodes of the touch screen TSP may serve as the common electrodes supplying the common voltage Vcom to the pixels. In this instance, the common voltage Vcom is supplied to the XY electrodes during the display period Tdis, and the stimulus signal or the resonant inductive signal is supplied to the XY electrodes during the first and second touch sensing periods Tpen and Tfinger.

When the touch screen TSP is embedded in the pixel array of the display panel DIS of the organic light emitting display as the display device, a pixel power voltage including a high potential power voltage VDD, a low potential power voltage VSS, a reference voltage, etc. may be supplied to the XY electrodes of the touch screen TSP during the display period Tdis.

During the display period Tdis, the display driving circuit is driven and applies the digital video data of the input image to the pixels of the display panel DIS. During the first touch sensing period Tpen, the first touch driving circuit 30 is driven and senses the touch location and the pen pressure of the pen on the touch screen TSP. During the second touch sensing period Tfinger, the second touch driving circuit 32 is driven and senses the touch location of the conductor, for example, the finger on the touch screen TSP.

When the touch screen TSP is formed on the upper substrate GLS1 separated from the pixel array of the display panel DIS as shown in FIGS. 4 and 5, there is almost no electrical coupling between the pixel array and the touch screen TSP. Thus, as shown in (B) of FIG. 9 when the touch screen TSP is separated from the pixel array of the display panel DIS, one frame period may be assigned as the display period Tdis. Further, one frame period may be divided into the first and second touch sensing periods Tpen and Tfinger. In this instance, the display period Tdis may overlap the first and second touch sensing periods Tpen and Tfinger.

Figure 10:
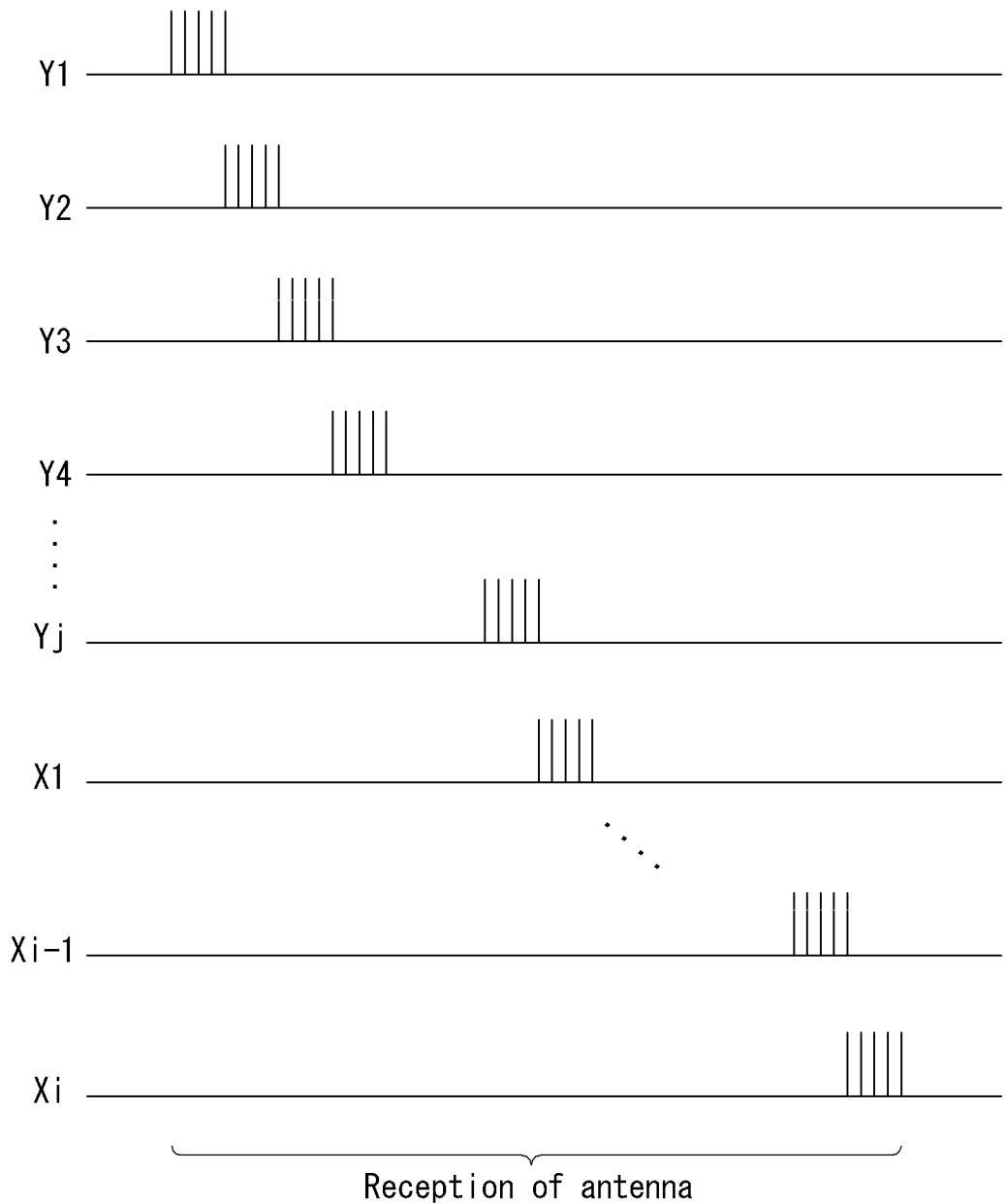
FIG. 10 is a waveform diagram showing a touch sensing operation of a pen.

FIG. 10 is a waveform diagram showing a touch sensing operation of the pen.

As shown in FIG. 10, the first touch driving circuit 30 operates in the first touch sensing period Tpen and sequentially supplies the resonant inductive signal to the XY electrodes Y1 to Yj and X1 to Xi, thereby inducing a resonance of the pen PEN. The resonant circuit of the pen PEN resonates in response to the resonant inductive signal input as the electric field through the capacitance Csx and generates the resonance signal. The antenna ANT receives the resonance signal of the pen PEN through changes in the electromagnetic field. The first touch driving circuit 30 converts an analog resonance signal received through the antenna ANT into digital data and calculates an amplitude and a phase of the resonance signal in the digital data, thereby sensing the location and the pen pressure of the pen PEN.

Figure 11:
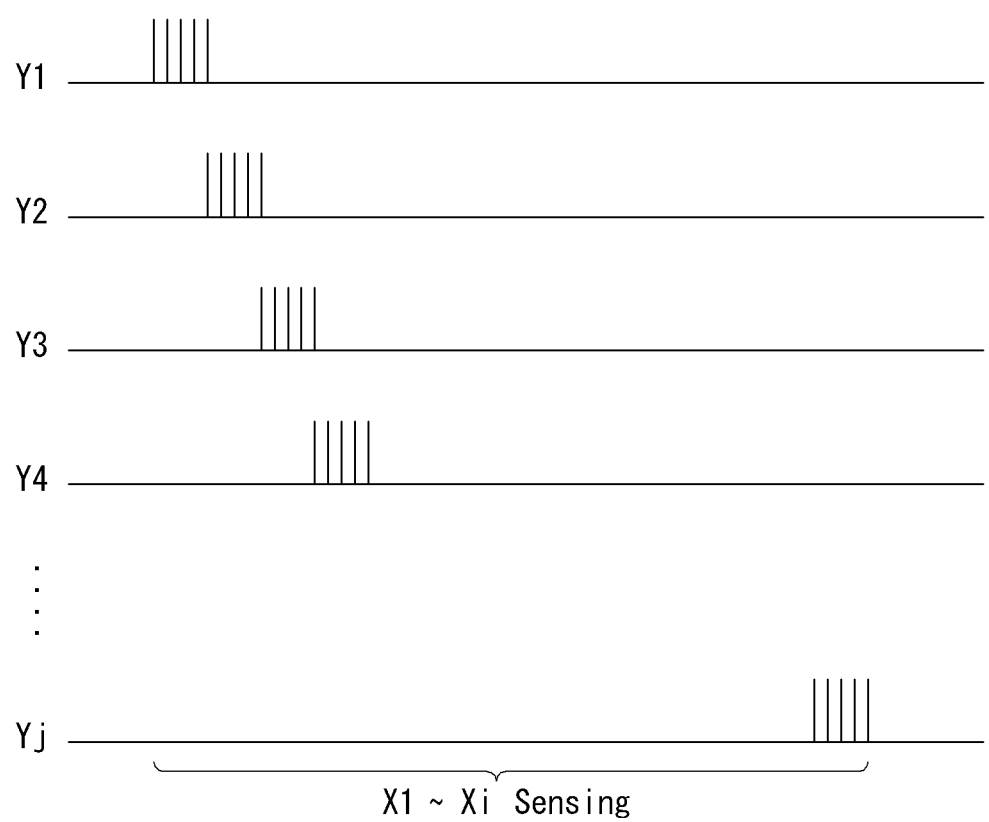
FIG. 11 is a waveform diagram showing a touch sensing operation of a finger.

FIG. 11 is a waveform diagram showing a touch sensing operation of the finger.

As shown in FIG. 11, the second touch driving circuit 32 operates in the second touch sensing period Tfinger. In the mutual capacitance, the second touch driving circuit 32 sequentially supplies the stimulus signal to the Y electrodes Y1 to Yj and receives charges of the touch sensors Cts through the X electrodes X1 to Xi in synchronization with the stimulus signal. When the touch sensors Cts are touched with the finger, the second touch driving circuit 32 senses the touch input based on a change amount of charges of the touch sensors Cts before and after the touch operation. Thus, during the second touch sensing period Tfinger, the Y electrodes Y1 to Yj belonging to the Y electrode group operate as Tx channel electrodes supplying the stimulus signal to the touch sensors Cts, and the X electrodes X1 to Xi belonging to the X electrode group operate as Rx channel electrodes receiving the charges from the touch sensors Cts.

In the self capacitance, the second touch driving circuit 32 sequentially supplies the stimulus signal to the X electrodes X1 to Xi and the Y electrodes Y1 to Yj. In the self capacitance, the second touch driving circuit 32 senses the touch input through the X electrodes X1 to Xi and the Y electrodes Y1 to Yj based on changes in a falling edge time or a rising edge time of the stimulus signal before and after the touch operation. Thus, during the second touch sensing period Tfinger, the X electrodes X1 to Xi and the Y electrodes Y1 to Yj operate as the Tx channel electrodes and the Rx channel electrodes, respectively.

Figure 12:
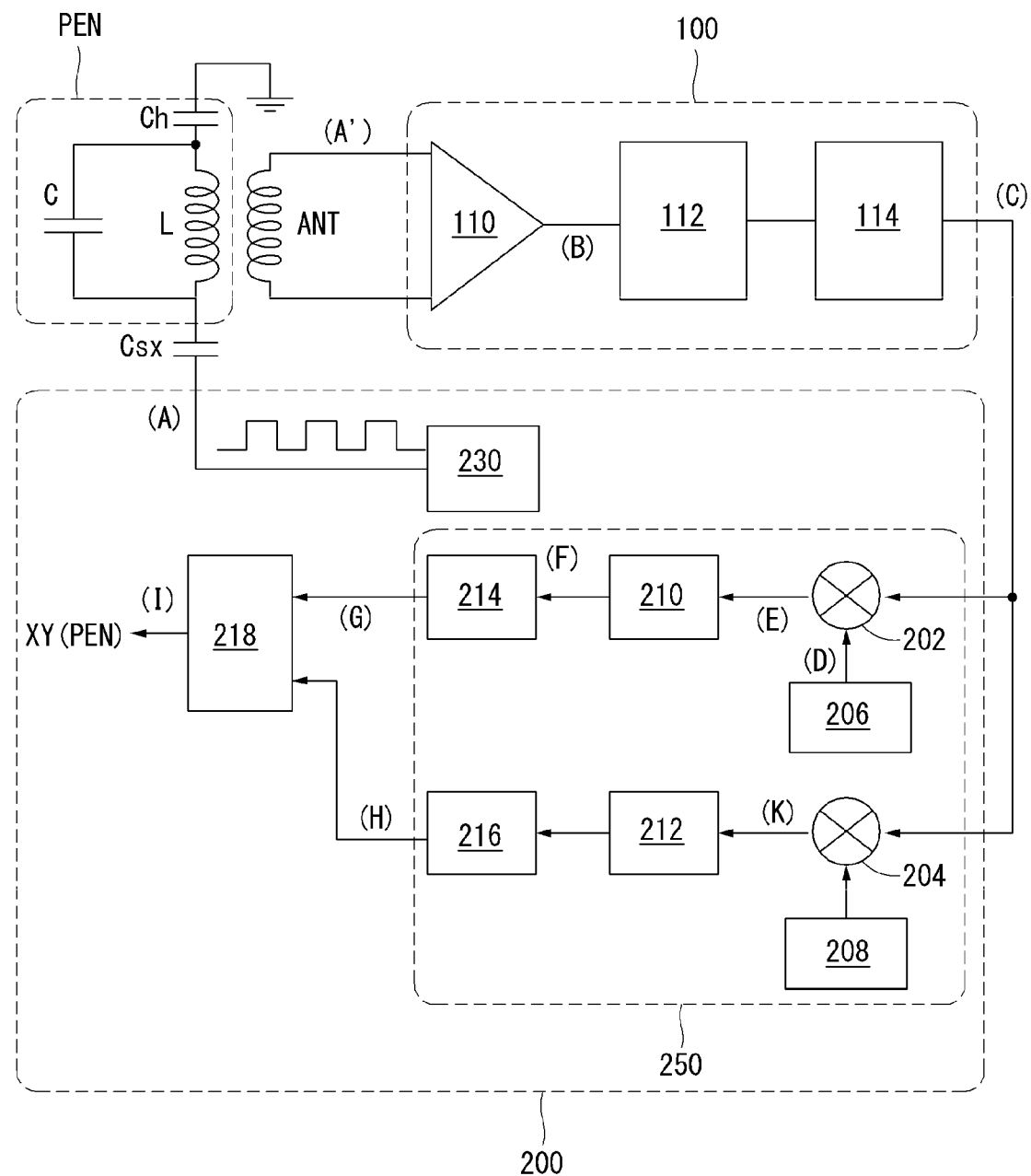
FIG. 12 is a circuit diagram showing in detail a first touch driving circuit according to an exemplary embodiment of the invention.
Figure 13:
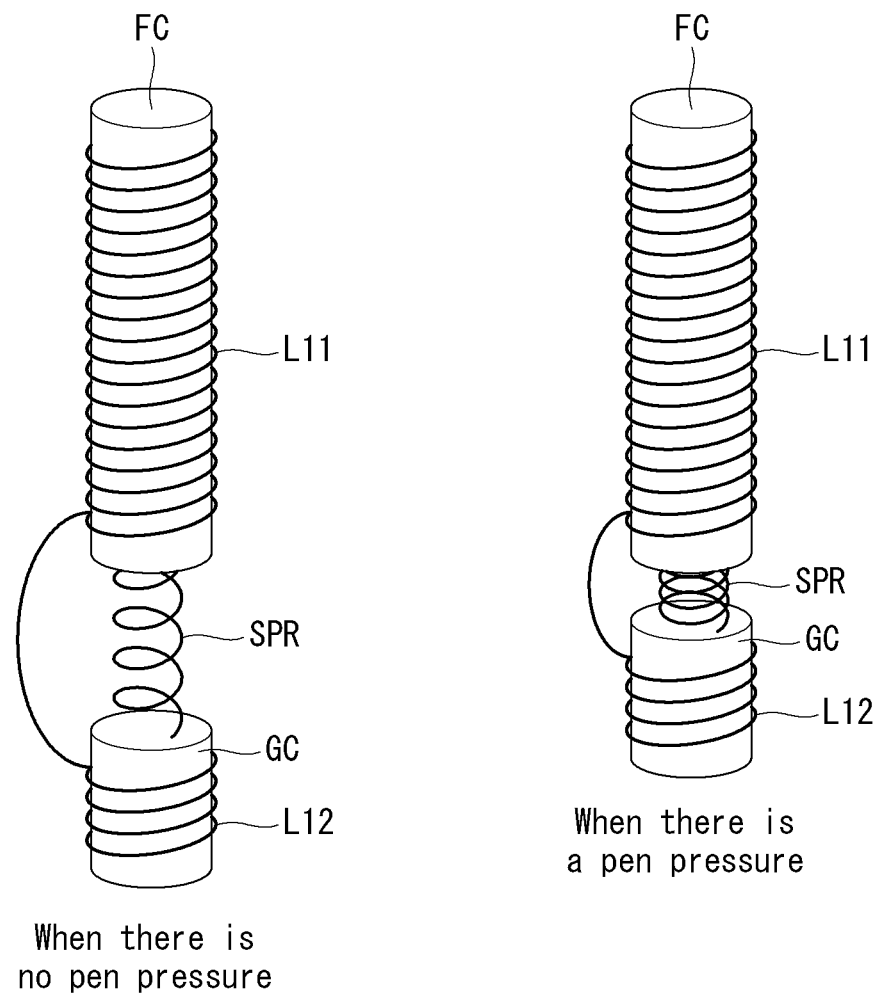
FIG. 13 shows an inductor embedded in a pen.
Figure 14:
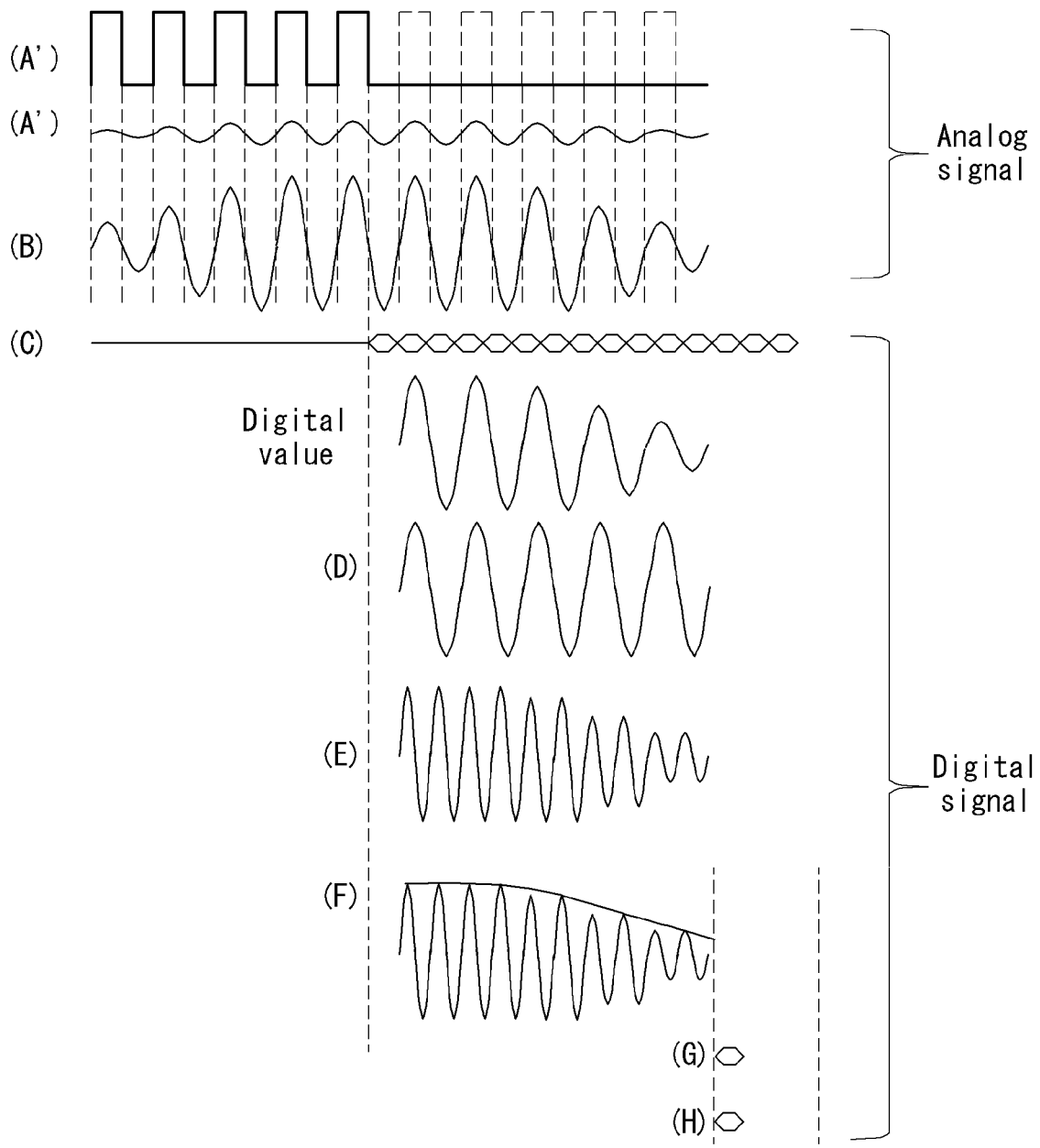
FIG. 14 is a waveform diagram showing an operation of a first touch driving circuit.

FIG. 12 is a circuit diagram showing in detail the first touch driving circuit 30. FIG. 13 shows an inductor embedded in the pen. FIG. 14 is a waveform diagram showing an operation of the first touch driving circuit 30.

As shown in FIGS. 12 to 14, the first touch driving circuit 30 includes the analog signal processing unit 100 and the digital signal processing unit 200.

The pen PEN includes an LC parallel resonant circuit, in which an inductor L and a capacitor C are connected in parallel. When the tip of the pen PEN is pressed on the touch screen, an inductance value and a capacitance value in the resonant circuit of the pen PEN change. Hence, a resonant frequency of the resonant circuit changes. In FIG. 12, 'Ch' connected to the pen PEN denotes a parasitic capacitance generated when the human holds the pen PEN. When a frequency of the resonant inductive signal applied to the pen PEN through the capacitance Csx is equal to the resonant frequency of the LC parallel resonant circuit, the pen PEN generates the resonance signal. Thus, the pen PEN does not require separate electric power connected to the LC parallel resonant circuit. The resonance signal of the pen PEN is received by the antenna ANT.

The resonant inductive signal applied to the pen PEN is generated in the digital signal processing unit 200. The resonant inductive signal may be generated in the digital signal processing unit 200 in various types including a square wave signal, a sine wave signal, etc. The digital signal processing unit 200 may generate a resonant inductive signal having a desired frequency by combining signals each having a different period. The digital signal processing unit 200 may change a period of the resonant inductive signal and thus may change a frequency of the resonant inductive signal.

The inductance in the LC parallel resonant circuit of the pen PEN varies depending on the pen pressure. For this, the inductor L may be implemented as shown in FIG. 13. A coil L11 wound on a ferrite core FC and a coil L12 wound on a guide core GC are connected in series to each other. A spring SPR is installed between the ferrite core FC and the guide core GC. According to an equation of "$L=\mu SN^2/l$", the inductance is proportional to magnetic permeability $\mu$, cross-sectional area S of the coil, and the square of N turns and is inversely proportional to length (l) of the coil. Thus, when the pen PEN is pressed on the touch screen TSP and the pen pressure of the pen PEN is generated, a distance between the ferrite core FC and the guide core GC decreases as the spring SPR is compressed. In other words, when the pen pressure of the pen PEN is generated, magnetic permeability $\mu$ increases and length (l) of the coil decreases. Hence, the inductance L increases. When the inductance L in the LC parallel resonant circuit increases, the resonant frequency decreases. The embodiment of the invention may decide the pen pressure using the resonant frequency changing when the pen pressure is generated.

In FIGS. 12 and 14, (A) shows an example of a resonant inductive signal of a square wave of the electric field applied to the pen PEN through the capacitance Csx. (A') is an analog signal measured in the antenna ANT when the antenna ANT receives the resonance signal generated from the pen PEN in response to the resonant inductive signal (A) of the square wave. The resonance signal generated in the pen PEN may be represented by $V=V_0 \cdot e^{-t/\tau} \cdot \cos(\omega t+\varphi)$. A resonant frequency $\omega$ may change depending on the pen pressure of the pen PEN.

The analog signal processing unit 100 amplifies the analog resonance signal received through the antenna ANT and extracts a frequency band of the resonance signal of the pen PEN, thereby outputting a digital resonance signal. For this, the analog signal processing unit 100 includes an amplifier 110, a band pass filter (BPF) 112, and an analog-to-digital converter (ADC) 114.

The amplifier 110 amplifies an antenna signal by its gain and transmits the antenna signal to the BPF 112. In FIGS. 12 and 14, (B) is the antenna signal amplified by the amplifier 110. The BPF 112 cuts off a frequency band except the resonant frequency of the LC parallel resonant circuit, removes a noise from the antenna signal, and extracts the resonance signal. The ADC 114 quantizes the resonance signal input from the BPF 112 and outputs a digital resonance signal.

In FIGS. 12 and 14, (C) is the digital resonance signal output from the ADC 114 and may be represented by S(t)·sin(wt+φ), where S(t) is an amplitude of the resonance signal, ω is the resonant frequency, and φ is a phase.

When the resonance signal in the digital signal input from the analog signal processing unit 100 is represented by a complex number, the digital signal processing unit 200 extracts a real part and an imaginary part from the complex number and calculates the magnitude (i.e., the amplitude) of the resonance signal based on the real part and the imaginary part. The digital signal processing unit 200 compares the magnitude of the resonance signal with a predetermined reference value and decides whether or not the pen PEN is sensed on the touch screen TSP. At this time, the digital signal processing unit 200 calculates location coordinates of the pen PEN based on a location of the XY electrode, to which the resonance signal is applied. Further, the digital signal processing unit 200 decides the pen pressure of the pen PEN based on the changes in the frequency of the resonance signal of the pen PEN. For this, the digital signal processing unit 200 includes a resonant inductive signal generator 230, a digital demodulator 250, and a location and pen pressure decision unit 218.

Figure 23:
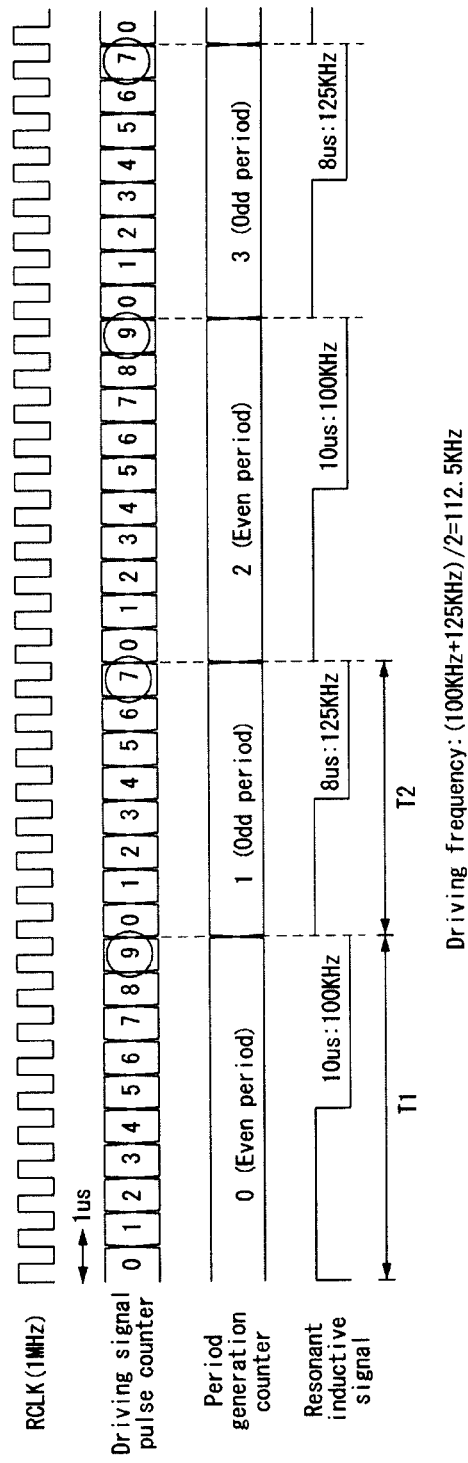
FIG. 23 is a waveform diagram showing an operation of a resonant inductive signal generator shown in FIG. 21.
Figure 24:
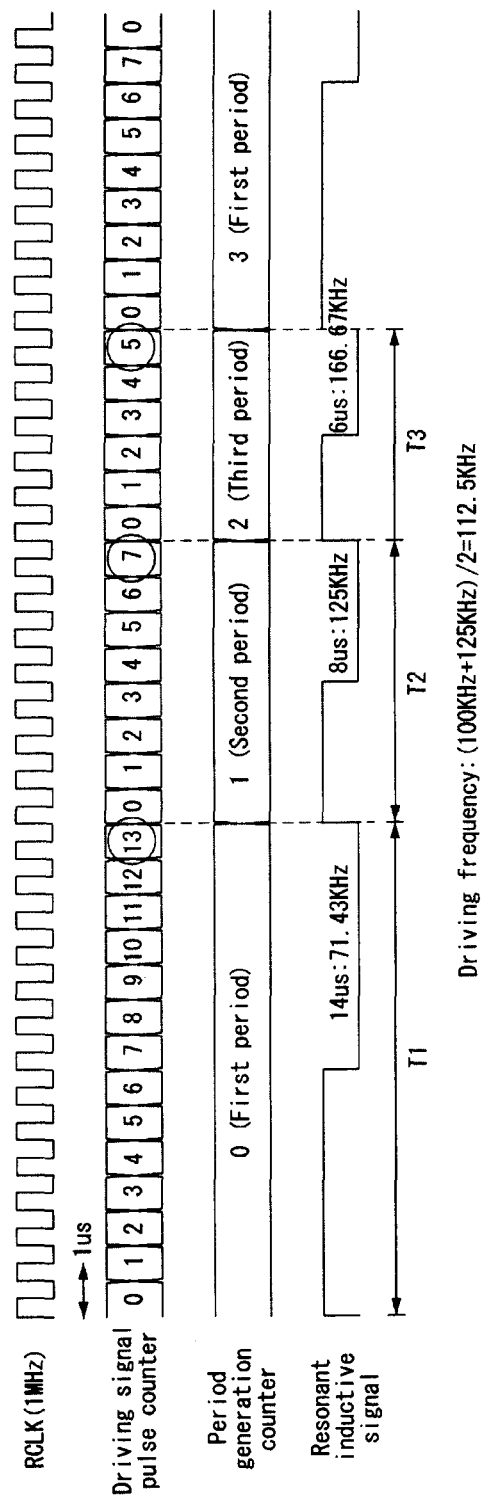
FIG. 24 is a waveform diagram showing an operation of a resonant inductive signal generator shown in FIG. 22 when N is 3.

The resonant inductive signal generator 230 generates a resonant inductive signal having a frequency equal to the resonant frequency of the pen PEN and sequentially supplies the resonant inductive signal to the XY electrodes X1 to Xi and Y1 to Yj as shown in FIG. 10. The resonant inductive signal may have different periods T1 and T2 as shown in FIGS. 23 and 24.

Figure 21:
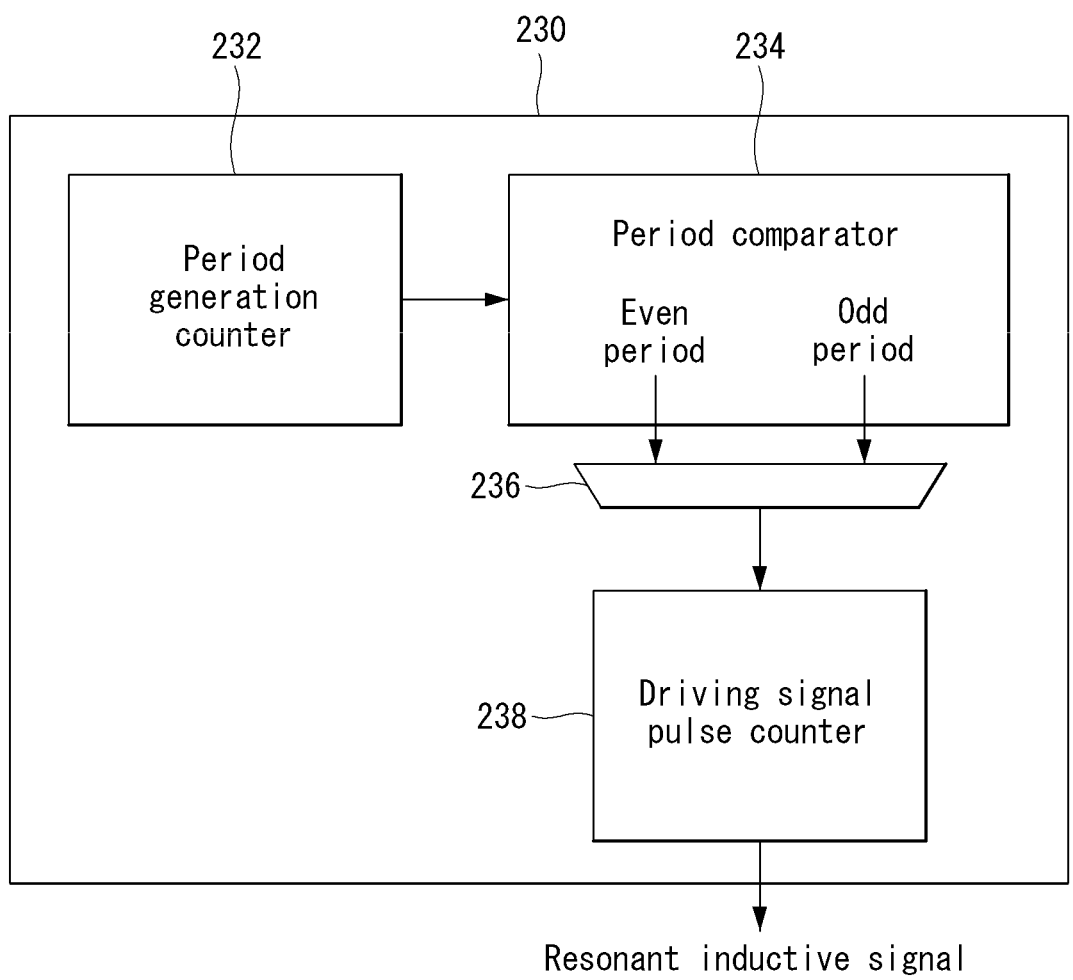
FIGS. 21 and 22 show in detail a resonant inductive signal generator according to an exemplary embodiment of the invention.
Figure 22:
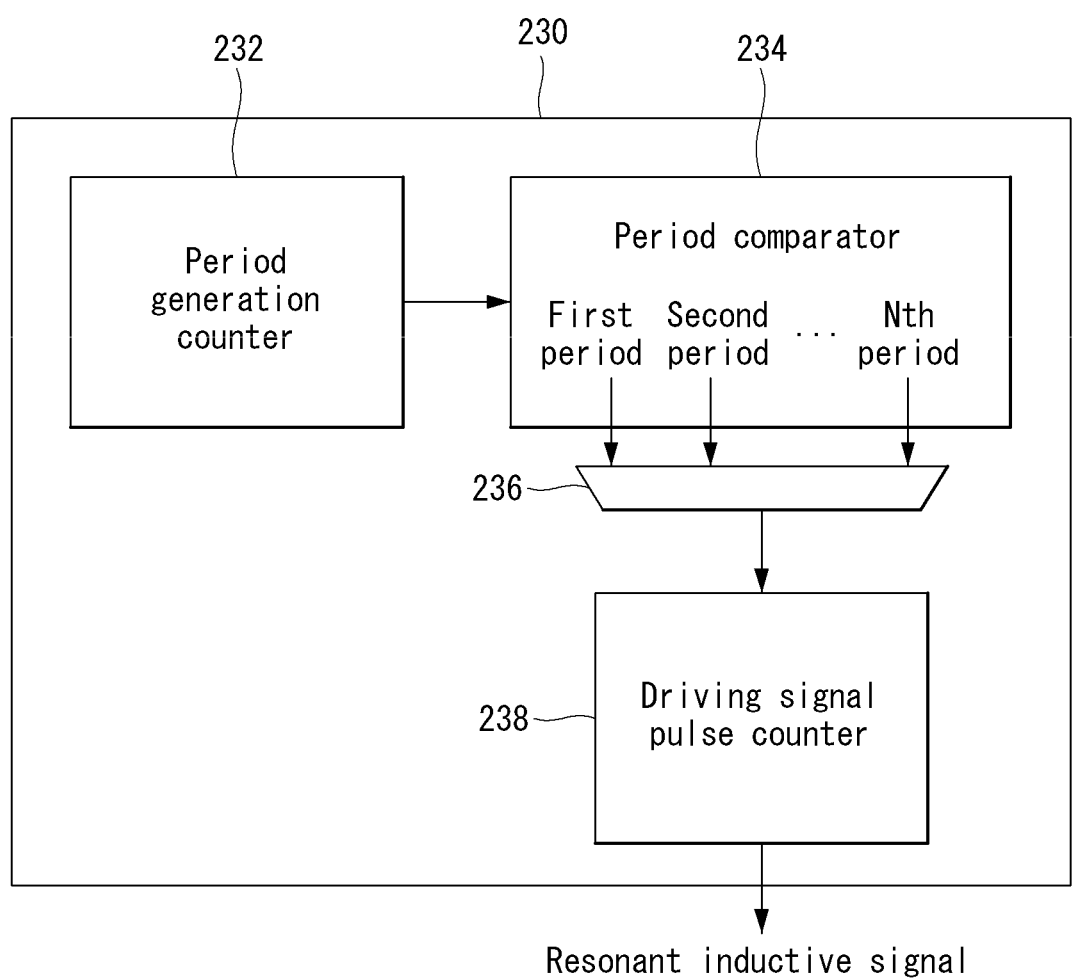

As shown in FIGS. 21 and 22, the resonant inductive signal generator 230 is configured as a digital circuit including a counter embedded therein. The counter adjusts a frequency of the resonant inductive signal. In the digital circuit, a frequency resolution increases as clocks RCLK (refer to FIGS. 23 and 24) of the counter increases. However, because power consumption increases due to an increase in the clock, there is a limit to the increase in the frequency resolution. The embodiment of the invention changes the period of the resonant inductive signal in each period and increases the frequency resolution. Hence, the embodiment of the invention may further improve the frequency resolution than a method for increasing an operation clock of the counter.

When it is decided that the pen PEN is positioned on the touch screen TSP based on an output (I) of the location and pen pressure decision unit 218, coordinate information of the pen PEN may be calculated based on coordinate information of the XY electrodes X1 to Xi and Y1 to Yj, to which the resonant inductive signal is applied.

The digital demodulator 250 extracts the real part and the imaginary part of the resonance signal from the digital resonance signal and adds a result of removing a high frequency noise from each of the real part and the imaginary part n times, where n is a positive integer equal to or greater than 2. The digital demodulator 250 supplies the addition result to the location and pen pressure decision unit 218. For this, the digital demodulator 250 includes first and second oscillators 206 and 208, first and second multipliers 202 and 204, first and second low pass filters (LPF) 210 and 212, and first and second integrators 214 and 216.

The first oscillator 206 inputs an oscillating signal (D), of which a frequency and a phase are the same as the resonance signal, to the first multiplier 202, so as to extract the real part of the resonance signal. In FIGS. 12 and 14, when (C) is represented by S(t)·sin(wt+φ), (D) may be represented by sin(wt).

The first multiplier 202 detects an envelope of the real part from the received resonance signal. The first multiplier 202 multiplies the received resonance signal (C) by the oscillating signal (D) from the first oscillator 206 to output a result (E). In FIGS. 12 and 14, when (C) is represented by S(t)·sin(wt+φ) and (D) is represented by sin(wt), the output (E) of the first multiplier 202 may be represented by $-S(t)\frac{1}{2}\{\cos(2wt+\varphi)-\cos(\varphi)\}$. The first LPF 210 removes the high frequency noise from the output (E) of the first multiplier 202 and supplies a DC component to the first integrator 214. In FIGS. 12 and 14, when (E) is represented by $-S(t)\frac{1}{2}\{\cos(2wt+\varphi)-\cos(\varphi)\}$, an output (F) of the first LPF 210 may be represented by $S(t)\frac{1}{2}\cos(\varphi)$.

The first integrator 214 adds data of the real part (In-Phase, I) received from the first LPF 210 n times and supplies an addition result to the location and pen pressure decision unit 218. If the first integrator 214 adds the data (I) 1024 times, (G) may be represented by $\Sigma_{k=0}^{1023} I_k$ in FIGS. 12 and 14.

The second oscillator 208 inputs an oscillating signal, which has the same frequency as the resonance signal and a phase delayed from the resonance signal by 90°, to the second multiplier 204, so as to extract the imaginary part of the resonance signal. In FIGS. 12 and 14, when (C) is represented by S(t)·sin(wt+φ), an output of the second oscillator 208 may be represented by cos(wt). The second multiplier 204 detects an envelope of the imaginary part from the received resonance signal. The second multiplier 204 multiplies the received resonance signal (C) by the oscillating signal from the second oscillator 208 to get an output (K), $+S(t)\frac{1}{2}\{\sin(2wt+\varphi)+\sin(\varphi)\}$. The second LPF 212 removes the high frequency noise from the output (K) of the second multiplier 204 and supplies a DC component to the second integrator 216. An output of the second LPF 212 may be represented by $S(t)\frac{1}{2}\sin(\varphi)$.

The second integrator 216 adds data of the imaginary part (Quadrature, Q) received from the second LPF 212 n times and supplies an addition result to the location and pen pressure decision unit 218. If the second integrator 216 adds the imaginary part data (I) 1024 times, (H) may be represented by $\Sigma_{k=0}^{1023} Q_k$ in FIGS. 12 and 14.

The location and pen pressure decision unit 218 calculates a root mean square (RMS) value of data input from the first and second integrators 214 and 216 and decides the magnitude and the resonant frequency of the resonance signal. The RMS value is calculated by $\sqrt{I_{sum}^2 + Q_{sum}^2}$, where Isum is the real part (In-phase) of the resonance signal accumulated by the first integrator 214, and Qsum is the imaginary part (Quadrature, Q) of the resonance signal accumulated by the second integrator 216.

The location and pen pressure decision unit 218 compares the magnitude of the resonance signal with a predetermined reference value and decides that the pen is positioned on the touch screen TSP when the magnitude of the resonance signal is greater than the predetermined reference value. At this time, the location and pen pressure decision unit 218 outputs location information of the pen PEN based on coordinates of the XY electrode, to which the resonant inductive signal is applied. Further, the location and pen pressure decision unit 218 calculates the pen pressure of the pen PEN based on the changes in the resonant frequency of the pen PEN and outputs the pen pressure information. In FIGS. 12 and 14, (I) is the location and pen pressure information XY(PEN) of the pen PEN the location and pen pressure decision unit 218 outputs as the digital data.

The first and second oscillators 206 and 208 may be implemented as a digital pulse generator, for example, a numerically controlled oscillator (NCO) capable of changing an output frequency. The resonant inductive signal generator 230 is configured as the digital circuit including the counter embedded therein as shown in FIGS. 21 and 22. The resonant inductive signal generator 230 changes a period setting value and thus may easily change the frequency of the resonant inductive signal. Thus, the touch sensing system according to the embodiment of the invention can easily change the resonant frequency of the pen PEN. The frequency of the resonant inductive signal output from the resonant inductive signal generator 230 may vary within a frequency range, which is set to a predetermined pen pressure measuring range (hereinafter referred to as "pen pressure scale"), according to a predetermined rule.

The embodiment of the invention does not use the XY electrodes as the antenna. All of conductors each form a self inductance when an AC current is applied to them, and may radiate an electromagnetic field. However, because the XY electrodes according to the embodiment of the invention have very low antenna efficiency due to the problem of the resistance and the length when serving as the antenna in the same manner as related art finger touch electrodes, the XY electrodes are not used as the antenna. Because the XY electrodes are formed of the material, for example, ITO having a high resistance, the antenna efficiency of the XY electrodes is low.

In a dipole antenna, a frequency of a signal capable of being transmitted and received may vary depending on a length of the dipole antenna. When a wavelength, a transmission velocity, and a frequency of a signal are λ, c, and f, respectively, an equation of "λ=c/f" is given. According to the above equation, when a frequency of a received signal of the antenna decreases, a wavelength of the received signal increases. Thus, the XY electrodes do not serve as a resonant frequency receiving antenna of the pen in consideration of the length and the shape of the XY electrodes formed inside the touch screen TSP. In the touch sensing system according to the embodiment of the invention, the XY electrodes do not serve as the antenna and transmit the resonant inductive signal of the electric field to the pen PEN through electric coupling.

Figure 15:
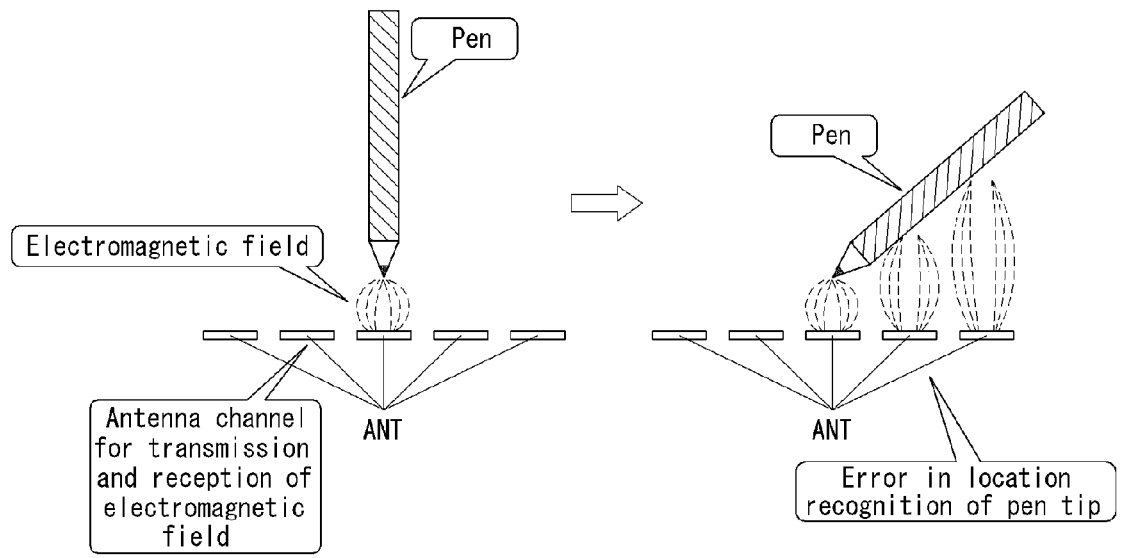
FIG. 15 illustrates an error in location recognition of a tip of a pen generated in a related art method for transmitting and receiving a resonance signal.
Figure 16:
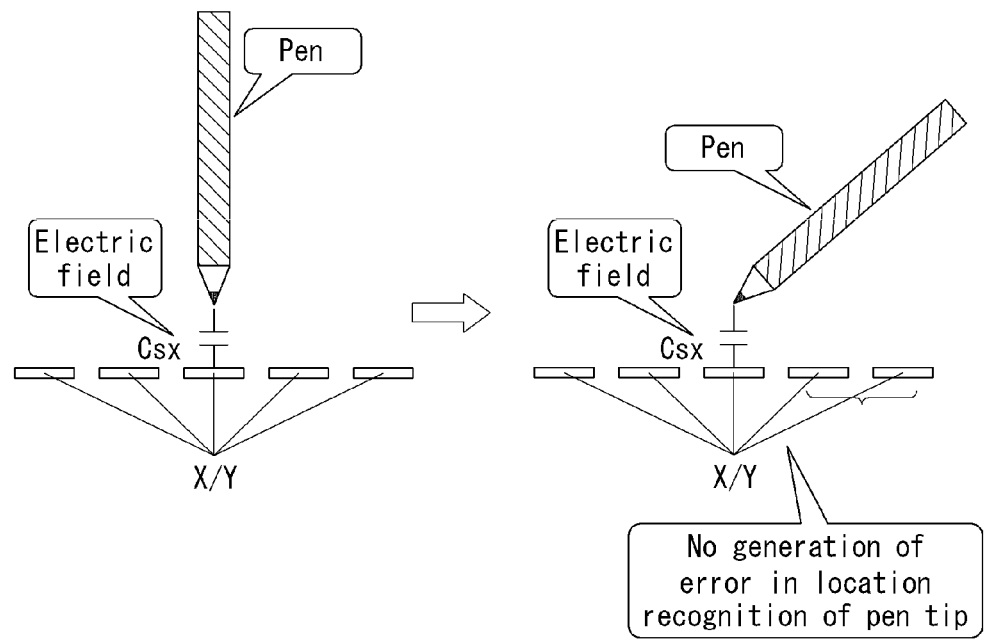
FIG. 16 illustrates an effect of an exemplary embodiment of the invention capable of preventing an error in location recognition of a tip of a pen.

If the transmitting and receiving method of the electromagnetic field through the antenna is used as in the related art, an error in detecting the location of the pen may be generated. The related art manufactures a pen tip positioned at an end of the pen as a nonconductor and mounts wires wound on a ferrite core near the pen tip. As shown in FIG. 15, when the pen is inclined, an inductor of the pen affects an antenna channel not touching the pen due to such a structure of the pen. Hence, it is difficult to accurately decide a location of the pen tip. On the other hand, as shown in FIG. 16, when the XY electrodes according to the embodiment of the invention are used, the resonant inductive signal is transmitted to the pen in the electric coupling through the capacitance Csx existing between the XY electrodes and the pen. Therefore, the embodiment of the invention may prevent the error in the location recognition of the pen tip generated in the related art.

FIGS. 17 and 18 show an example of a method for deciding the touch location of the pen.

In FIG. 17, 'TX' denotes the Y electrode, and 'RX' denotes the X electrode. More specifically, FIG. 17 shows a partial waveform of an antenna receiving signal obtained when the resonant inductive signal is sequentially supplied to a total of (32×18) XY electrodes TX0 to TX31 and RX0 to RX17.

As shown in FIG. 17, when the pen does not approach the touch screen, a magnitude (i.e., an amplitude) of the resonance signal is measured as a small value in the same manner as an antenna signal in a sensing period of the Y electrode TX12. On the other hand, when the pen touches or approaches the touch screen, the magnitude of the resonance signal received through the antenna is measured as a large value in the same manner as the antenna signal in a sensing period of the X electrode RX6. Thus, the touch sensing system according to the embodiment of the invention receives the resonance signal through the antenna at each channel of the XY electrodes (or the TX and RX electrodes), calculates the RMS value, and calculates the magnitude of the resonance signal at each channel of the XY electrodes. The touch sensing system compares the magnitude of the resonance signal with a predetermined threshold value and decides that the pen is positioned on the touch screen when the magnitude of the resonance signal is greater than the predetermined threshold value.

FIG. 18 is a graph indicating the RMS value measured in each channel. More specifically, FIG. 18 shows an example where the pen touches a crossing of the Y electrode TX10 (or Y10) and the X electrode RX6 (or X6). The touch sensing system may accurately calculate coordinates of the pen through coordinates of the crossing of the Y electrode TX10 and the X electrode RX6.

Figure 19:
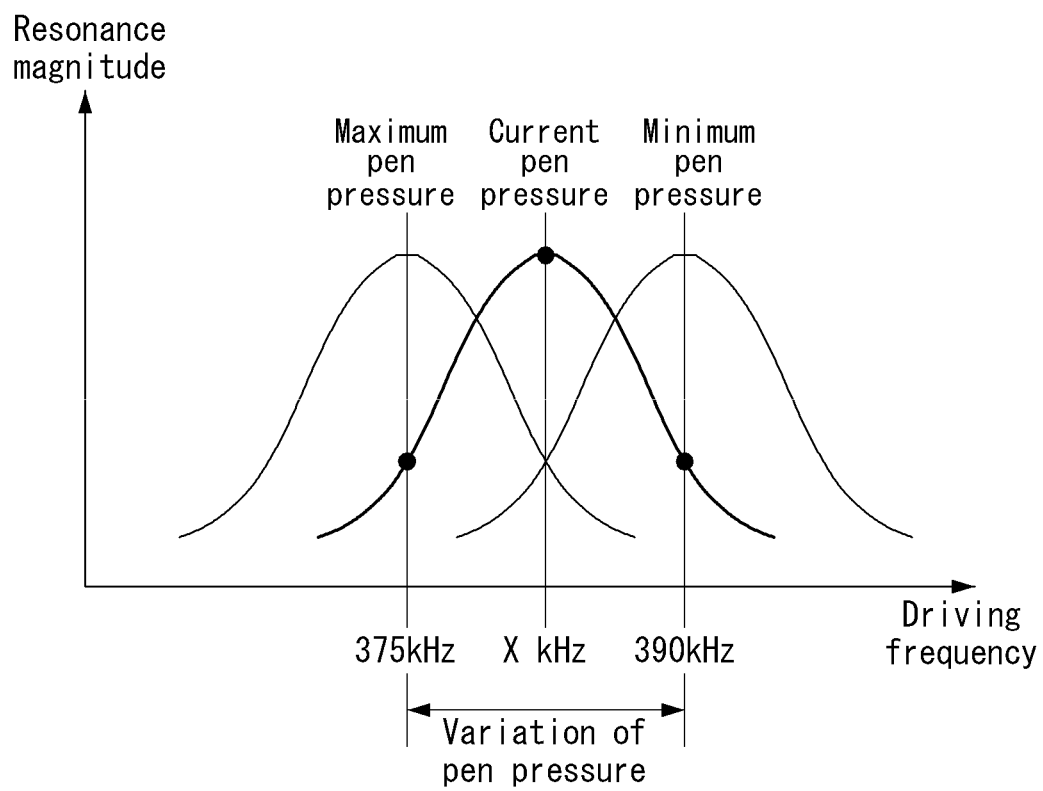
FIGS. 19 and 20 show an example of a method for deciding a pen pressure of a pen.
Figure 20:
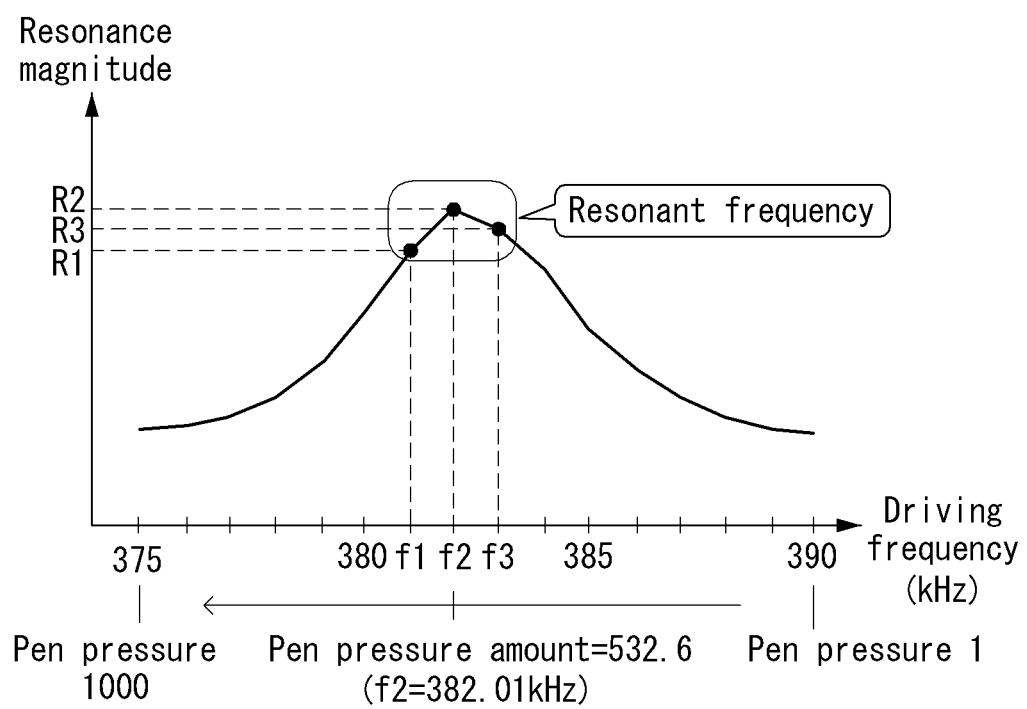

FIGS. 19 and 20 show an example of a method for deciding the pen pressure of the pen. The method is described on the assumption that the resonant frequency generated in the resonant circuit of the pen PEN varies depending on the pen pressure of the pen PEN.

As shown in FIG. 19, when the pen pressure of the pen PEN is measured as a minimum value, the resonant frequency of the pen PEN is about 390 kHz. Further, when the pen pressure of the pen PEN is measured as a maximum value, the resonant frequency of the pen PEN is about 375 kHz. The pen pressure of the pen PEN may be measured as a resonant frequency measured within a resonant frequency band of 375 kHz to 390 kHz. Thus, the embodiment of the invention measures a magnitude of a resonance signal received through the antenna ANT while changing a frequency band of the resonant inductive signal within the above resonant frequency band and measures a resonant frequency of the resonance signal having a maximum magnitude, so as to measure the pen pressure of the pen PEN when the pen PEN is positioned on the touch screen TSP. Hence, the embodiment of the invention may decide the pen pressure of the pen PEN.

FIG. 20 shows the result of measuring a resonance magnitude when the pen PEN applies a predetermined pressure to the touch screen TSP.

As shown in FIG. 20, a resonant frequency fo may be calculated using the formula of centre of gravity, and an amount P of the pen pressure of the of the pen PEN may be decided based on the resonant frequency fo.

$$f_0 = \frac{f1R1 + f2R2 + f3R3}{R1 + R2 + R3} = \frac{(381 \times 300) + (382 \times 320) + (383 \times 310)}{300 + 320 + 310} = 382.011 \text{ kHz} \quad (1)$$

In the following equation (1), f2 is a resonant frequency of a resonance signal having a maximum magnitude, f1 and f3 are adjacent frequencies of the resonant frequency f2, and R1, R2, and R3 are the magnitudes of the resonance signal measured at the resonant frequency f2 and the adjacent frequencies f1 and f3.

$$P = \frac{f_{pmin} - f_{pcur}}{f_{pmin} - f_{pmax}} \times P_s = \frac{390 - 382.011}{390 - 375} \times 1000 = 532.6 \qquad (2)$$

In the following equation (2), 'fpmin' is the resonant frequency when the pen pressure has a minimum value within a pen pressure scale (Ps=1000), 'fmax' is the resonant frequency when the pen pressure has a maximum value within the pen pressure scale (Ps=1000), and 'fcur' is the resonant frequency of the pen pressure to be currently measured.

The embodiment of the invention is not limited to FIGS. 19 and 20 showing only one example of the method for measuring the pen pressure. For example, the resonant frequency may increase in proportion to the pen pressure. Further, the above equation uses the three adjacent frequencies of the resonant frequency, but the embodiment of the invention is not limited thereto.

FIGS. 21 and 22 show in detail the resonant inductive signal generator 230 according to the embodiment of the invention. FIG. 23 is a waveform diagram showing an operation of the resonant inductive signal generator 230 shown in FIG. 21. FIG. 24 is a waveform diagram showing an operation of the resonant inductive signal generator 230 shown in FIG. 22 when N is 3, where N is a positive integer equal to or greater than 2.

As shown in FIGS. 21 to 24, the resonant inductive signal generator 230 includes a period generation counter 232, a period comparator 234, a multiplexer 236, and a driving signal pulse counter 238. The clocks RCLK are input to the counters 232 and 238 and the period comparator 234.

The period generation counter 232 sequentially outputs N period count signals each having a different length. The period comparator 234 compares the period count signals with predetermined period setting values and decides periods of the period count signals. The multiplexer 236 sequentially outputs the period count signals in previously determined order. The driving signal pulse counter 238 counts the periods of the period count signals received from the multiplexer 236 and outputs a resonant inductive signal having N periods.

As shown in FIGS. 21 and 23, the period generation counter 232 counts the clocks RCLK and maintains a count value until the count value of the clocks RCLK reaches (I–1), where 'I' is a positive integer equal to or greater than 2. When the count value reaches 'I', the period generation counter 232 increases the count value and outputs a first period count signal (or an odd period count signal). Next, the period generation counter 232 maintains a count value until the count value of the clocks RCLK reaches (J–1), where T is a positive integer equal to or greater than 2 and is different from 'I'. When the count value reaches 'J', the period generation counter 232 increases the count value and outputs a second period count signal (or an even period count signal). The period comparator 234 counts the period count signals received from the period generation counter 232 using the clocks RCLK and compares a count value of the period count signals with predetermined first and second period setting values. When the period count signal received from the period generation counter 232 is equal to the first period setting value, the period count signal is decided as the first period count signal. When the period count signal received from the period generation counter 232 is equal to the second period setting value, the period count signal is decided as the second period count signal. The first and second period setting values are previously stored in a register embedded in the period comparator 234 and may vary. The period comparator 234 inputs the first and second period count signals to the multiplexer 236, and the multiplexer 236 alternately outputs the first period count signal and the second period count signal.

The driving signal pulse counter 238 counts the clocks RCLK while the count value of the period generation counter 232 is equal to a first period, accumulates the count value until the count value of the clocks RCLK reaches (I–1), and resets the count value at a rising edge of the next clock RCLK. The driving signal pulse counter 238 counts the clocks RCLK while the count value of the period generation counter 232 is equal to a second period, accumulates the count value until the count value of the clocks RCLK reaches (J–1), and resets the count value at a rising edge of the next clock RCLK.

The driving signal pulse counter 238 rises the resonant inductive signal when the count value is reset to zero. The driving signal pulse counter 238 falls the resonant inductive signal when the count value is 112 during an input of the first period count signal, and falls the resonant inductive signal when the count value is J/2 during an input of the second period count signal. Thus, the resonant inductive signal includes a first period T1 and a second period T2 different from the first period T1.

In an example of FIG. 23, the clock RCLK is generated at a frequency of 1 MHz (1 period: 1 μs), 'I' is 10, and 'J' is 8. The first period T1 is 10 μs (frequency: 100 kHz), and the second period T2 is 8 μs (frequency: 125 kHz). The frequency of the resonant inductive signal is an average value of the frequency of the first period T1 and the frequency of the second period T2 and is (100 kHz+125 kHz)/2=112.5 kHz.

As shown in FIGS. 22 and 24, the resonant inductive signal may be generated as a signal including N periods.

As shown in FIGS. 22 and 24, the period generation counter 232 counts the clocks RCLK, maintains a count value until the driving signal pulse counter 238 reaches (I–1), increases the count value when the count value is reset to zero, and outputs the resonant inductive signal corresponding to the count value during a first period T1. Next, the period generation counter 232 maintains a count value until the driving signal pulse counter 238 reaches (J–1), increases the count value when the count value is reset to zero, and outputs the resonant inductive signal corresponding to the count value during a second period T2. Subsequently, the period generation counter 232 counts the clocks RCLK, maintains a count value until the driving signal pulse counter 238 reaches (K–1), where K is a positive integer equal to or greater than 2 and is different from I and J, increases the count value when the count value is reset to zero, and outputs the resonant inductive signal corresponding to the count value during a third period T3.

The period comparator 234 counts the period count signals received from the period generation counter 232 using the clocks RCLK and compares a count value of the period count signals with predetermined first, second, and third period setting values. When the period count signal received from the period generation counter 232 is equal to the first period setting value, the period count signal is decided as a first period count signal. When the period count signal received from the period generation counter 232 is equal to the second period setting value, the period count signal is decided as a second period count signal. When the period count signal received from the period generation counter 232 is equal to the third period setting value, the period count signal is decided as a third period count signal.

The first, second, and third period setting values are previously stored in the register of the period comparator 234 and may vary. The period comparator 234 inputs the first, second, and third period count signals to the multiplexer 236, and the multiplexer 236 sequentially outputs the first, second, and third period count signals.

The driving signal pulse counter 238 counts the clocks RCLK while the count value of the period generation counter 232 is equal to the first period, accumulates the count value until the count value of the clocks RCLK reaches (I−1), and resets the count value at a rising edge of the next clock RCLK. The driving signal pulse counter 238 counts the clocks RCLK while the count value of the period generation counter 232 is equal to the second period, accumulates the count value until the count value of the clocks RCLK reaches (J−1), and resets the count value at a rising edge of the next clock RCLK. The driving signal pulse counter 238 counts the clocks RCLK while the count value of the period generation counter 232 is equal to the third period, accumulates the count value until the count value of the clocks RCLK reaches (K−1), and resets the count value at a rising edge of the next clock RCLK.

The driving signal pulse counter 238 rises the resonant inductive signal when the count value is reset to zero. The driving signal pulse counter 238 falls the resonant inductive signal when the count value is I/2 during an input of the first period count signal, and falls the resonant inductive signal when the count value is J/2 during an input of the second period count signal. Further, the driving signal pulse counter 238 falls the resonant inductive signal when the count value is K/2 during an input of the third period count signal. Thus, the resonant inductive signal includes the first period T1, the second period T2 different from the first period T1, and the third period T3 different from the first and second periods T1 and T2.

In an example of FIG. 24, the clock RCLK is generated at a frequency of 1 MHz (1 period: 1 μs), 'I' is 14, 'J' is 8, and 'K' is 6. The first period T1 is 14 μs (frequency: 71.43 kHz), the second period T2 is 8 μs (frequency: 125 kHz), and the third period T3 is 6 μs (frequency: 166.67 kHz). The frequency of the resonant inductive signal is an average value of the frequency of the first period T1, the frequency of the second period T2, and the frequency of the third period T3 and is (71.43 kHz+125 kHz+166.67 kHz)/3=121 kHz.

The embodiment of the invention may vary the frequency of the resonant inductive signal within the pen pressure scale while changing the period setting values, so as to minutely measure the pen pressure of the pen PEN.

As described above, the embodiment of the invention implements the touch screen including the electrodes for the pen touch and the antenna surrounding the pen touch electrodes and can sense the finger and the pen without an increase in the thickness of the display panel. Further, the embodiment of the invention can change the frequency of the resonant inductive signal through the simple method for changing the variable period setting values.

The embodiment of the invention applies the AC signal for inducing the resonance of the pen to the existing finger touch electrodes, transmits the AC signal to the pen through the electric coupling, and receives the resonance signal of the pen through the antenna. As a result, because the embodiment of the invention does not form the plurality of loop antennas of the touch sensing system on the substrate of the display panel, the embodiment of the invention can simplify the structure of the substrate of the display panel and can slim the display panel.

The loop antenna serves as the antenna only when a distance between the antennas is secured. On the other hand, the existing finger touch electrodes are formed in the shape of a conductive rod. Thus, the number of finger touch electrodes may be more than the number of loop antennas in the same area. As a result, the embodiment of the invention may minutely divide the sensing point capable of recognizing the touch input of the pen.

Because the embodiment of the invention processes the digital resonance signal, the embodiment of the invention does not require an analog comparator.

The embodiment of the invention does not use a related art waveform generator, in which an operating frequency is limited, and uses the digital pulse generator, in which there is no limit to changes in an operational frequency. Thus, the embodiment of the invention is advantageous to changes in the resonant frequency of the pen.

Because the embodiment of the invention minimizes the analog circuit in the circuit receiving the resonance signal of the pen, the embodiment of the invention is less affected by a surrounding environment than the related art.

Because the embodiment of the invention implements most of the circuits receiving the resonance signal of the pen as the digital signal processing circuit, the touch driving circuit may be implemented as one chip IC.

Because the embodiment of the invention embeds the microprocessor in the touch driving circuit, the embodiment of the invention can change the operational characteristic of the touch driving circuit and can easily implement the performance improvement algorithm of the touch driving circuit.

The embodiment of the invention does not measure the phase of the resonance signal, decides the location of the pen based on the resonance magnitude, and decides the pen pressure of the pen based on the resonant frequency. Thus, the embodiment of the invention may minimize the circuit for deciding the location and the pen pressure of the pen and may reduce the power consumption.

Because the related art detects the pen pressure of the pen based on the resonance signal of the pen and the phase of the resonant inductive signal applied to the pen, the related art is greatly affected by the parasitic capacitance or the parasitic inductance. On the other hand, the embodiment of the invention measures the pen pressure of the pen based on the resonance magnitude at each frequency of the resonant frequency band. Therefore, the embodiment of the invention is hardly affected by the parasitic capacitance or the parasitic inductance and can measure stably and accurately the pen pressure.

The embodiment of the invention can minutely measure the pen pressure of the pen while changing the frequency of the resonant inductive signal within the pen pressure scale, and can easily measure the pen pressure using the simple algorithm.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A touch sensing system comprising:
   a pen including a resonant circuit embedded therein;
   XY electrodes including X electrodes and Y electrodes substantially perpendicular to the X electrodes;
   an antenna around the XY electrodes; and
   a first touch driving circuit to supply a resonant inductive signal to the XY electrodes, analyze a resonance signal received through the antenna, and decide a location and a pen pressure of the pen,
   wherein the resonant inductive signal includes a plurality of periods, each having a different duration,
   wherein the first touch driving circuit includes:
   an analog signal processing unit to amplify an analog resonance signal received through the antenna, extract a frequency band of the resonance signal of the pen, and output a digital resonance signal;
   a resonant inductive signal generator to generate the resonant inductive signal and sequentially supply the resonant inductive signal to the XY electrodes;
   a digital demodulator to extract a real part and an imaginary part from the digital resonance signal of the pen and output a result of accumulating each of the real part and the imaginary part n times, where n is a positive integer equal to or greater than 2; and
   a location and pen pressure decision unit to calculate a root mean square (RMS) value of data input from the digital demodulator, measure a magnitude and a resonant frequency of the resonance signal, and measure the location and the pen pressure of the pen based on the magnitude and the resonant frequency of the resonance signal.

2. The touch sensing system of claim 1, further comprising a second touch driving circuit to supply a stimulus signal to the Y electrodes and receive charges through the X electrodes in synchronization with the stimulus signal.

3. The touch sensing system of claim 1, further comprising a second touch driving circuit to supply a stimulus signal to the X electrodes and the Y electrodes and receive charges through the X electrodes and the Y electrodes in synchronization with the stimulus signal.

4. The touch sensing system of claim 1, wherein the antenna is a single antenna surrounding the XY electrodes.

5. The touch sensing system of claim 1, wherein the resonant inductive signal generator includes:
   a period generation counter to sequentially output N period count signals each having a different length;
   a period comparator to compare the period count signals with predetermined period setting values and decide periods of the period count signals;
   a multiplexer to sequentially output the period count signals in previously determined order; and
   a driving signal pulse counter to count the periods of the period count signals received from the multiplexer and output the resonant inductive signal having the N periods,
   wherein the period setting values are variable.

6. The touch sensing system of claim 5, wherein the digital demodulator includes:

a first oscillator to output a first oscillating signal, of which a frequency and a phase are the same as the resonance signal of the pen received through the antenna;
a first multiplier to multiply the first oscillating signal by the resonance signal of the pen received through the antenna and output a multiplication result;
a first low pass filter to remove a high frequency noise from an output of the first multiplier;
a first integrator to add data input from the first low pass filter n times and supply an addition result to the location and pen pressure decision unit;
a second oscillator to output a second oscillating signal, which has the same frequency as the resonance signal of the pen received through the antenna and a phase delayed from the resonance signal by 90 degrees;
a second multiplier to multiply the second oscillating signal by the resonance signal of the pen received through the antenna and output a multiplication result;
a second low pass filter to remove a high frequency noise from an output of the second multiplier; and
a second integrator to add data input from the second low pass filter n times and supply an addition result to the location and pen pressure decision unit.

7. The touch sensing system of claim 6, wherein the analog signal processing unit includes:
   an amplifier to amplify the analog resonance signal received through the antenna;
   a band pass filter to cut off a frequency band excluding a resonant frequency of the pen from an output of the amplifier; and
   an analog-to-digital converter to convert an output of the band pass filter into the digital resonance signal.

8. The touch sensing system of claim 1, wherein the pen does not include separate electric power.

9. The touch sensing system of claim 8, wherein the resonant circuit of the pen includes an inductor and a capacitor,
   wherein the inductor includes a first coil wound on a ferrite core, a second coil wound on a guide core, and a spring positioned between the ferrite core and the guide core,
   wherein the first and second coils are connected in series to each other.

10. The touch sensing system of claim 1, wherein a frequency of the resonant inductive signal is an average value of frequencies of the plurality of periods and varies within a frequency range, within a predetermined pen pressure measuring range, to measure the pen pressure.

11. A method for driving a touch sensing system including a pen including a resonant circuit embedded therein, XY electrodes including X electrodes and Y electrodes substantially perpendicular to the X electrodes, and an antenna around the XY electrodes, the method comprising:
   supplying a resonant inductive signal to the XY electrodes; and
   analyzing a resonance signal received through the antenna to decide a location and a pen pressure of the pen,
   wherein the resonant inductive signal includes a plurality of periods, each having a different duration,
   wherein the first touch driving circuit includes:
   an analog signal processing unit to amplify an analog resonance signal received through the antenna, extract a frequency band of the resonance signal of the pen, and output a digital resonance signal;

a resonant inductive signal generator to generate the resonant inductive signal and sequentially supply the resonant inductive signal to the XY electrodes;

a digital demodulator to extract a real part and an imaginary part from the digital resonance signal of the pen and output a result of accumulating each of the real part and the imaginary part n times, where n is a positive integer equal to or greater than 2; and a location and pen pressure decision unit to calculate a root mean square (RMS) value of data input from the digital demodulator, measure a magnitude and a resonant frequency of the resonance signal, and measure the location and the pen pressure of the pen based on the magnitude and the resonant frequency of the resonance signal.

12. The method of claim 11, further comprising supplying a stimulus signal to the Y electrodes and receiving charges through the X electrodes in synchronization with the stimulus signal to sense a touch input of a finger.

13. The method of claim 11, further comprising supplying a stimulus signal to the X electrodes and the Y electrodes and receiving charges through the X electrodes and the Y electrodes in synchronization with the stimulus signal to sense a touch input of a finger.

14. The method of claim 11, wherein a frequency of the resonant inductive signal is an average value of frequencies of the plurality of periods and varies within a frequency range, within a predetermined pen pressure measuring range, to measure the pen pressure.

* * * * *